United States Patent
Mehta et al.

(10) Patent No.: US 9,632,828 B1
(45) Date of Patent: Apr. 25, 2017

(54) COMPUTING AND TRACKING CLIENT STALENESS USING TRANSACTION RESPONSES

(71) Applicants: Nirmal Mehta, Seattle, WA (US); Allan H. Vermeulen, Seattle, WA (US)

(72) Inventors: Nirmal Mehta, Seattle, WA (US); Allan H. Vermeulen, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 305 days.

(21) Appl. No.: 13/625,506

(22) Filed: Sep. 24, 2012

(51) Int. Cl.
| | |
|---|---|
| *H04L 15/16* | (2006.01) |
| *G06F 9/50* | (2006.01) |
| *G06F 9/52* | (2006.01) |
| *G06F 17/30* | (2006.01) |
| *H04L 29/08* | (2006.01) |
| *H04L 12/00* | (2006.01) |
| *H04L 29/06* | (2006.01) |
| *G06F 9/46* | (2006.01) |
| *G06F 15/16* | (2006.01) |
| *G06F 21/31* | (2013.01) |

(52) U.S. Cl.
CPC ............ *G06F 9/5011* (2013.01); *G06F 9/526* (2013.01); *G06F 17/30362* (2013.01); *H04L 12/00* (2013.01); *H04L 65/80* (2013.01); *H04L 67/1029* (2013.01); *G06F 9/466* (2013.01); *G06F 15/16* (2013.01); *G06F 17/30578* (2013.01); *G06F 21/31* (2013.01)

(58) Field of Classification Search
None
See application file for complete search history.

(56) References Cited

U.S. PATENT DOCUMENTS

| 4,665,520 A | 5/1987 | Strom et al. |
| 5,261,085 A | 11/1993 | Lamport |
| 5,301,309 A | 4/1994 | Sugano |

(Continued)

OTHER PUBLICATIONS

Bell Laboratories—"UNIX Programmer's Manual" Seventh Edition vol. 1, Jan. 1979.*

(Continued)

*Primary Examiner* — Ranodhi Serrao
*Assistant Examiner* — James Fiorillo
(74) *Attorney, Agent, or Firm* — Robert C. Kowert; Meyertons, Hood, Kivlin, Kowert & Goetzel, P.C.

(57) ABSTRACT

Distributed systems that maintain data items or state on multiple server nodes (e.g., a storage system or lock service) may receive transaction requests from clients that include read requests and/or write requests. If a transaction request includes a read request, a server node may determine a node staleness value for the requested data from the server's perspective, and may return a transaction response to the client that includes the requested data and the node staleness value. The client may compute a client staleness value for the requested data dependent on the node staleness value in the transaction response, rather than on a separate heartbeat process. If the transaction also includes a write request, the server may return the transaction response for the read request before the write commits. In this case, the client may not use the requested data until it receives another response indicating that the write committed.

27 Claims, 10 Drawing Sheets

(56) References Cited

U.S. PATENT DOCUMENTS

| | | | |
|---|---|---|---|
| 5,434,994 A * | 7/1995 | Shaheen | G06F 12/0815 707/999.202 |
| 5,802,267 A | 9/1998 | Shirakihara et al. | |
| 5,845,292 A * | 12/1998 | Bohannon | G06F 11/1469 |
| 5,923,832 A | 7/1999 | Shirakihara et al. | |
| 6,078,930 A | 6/2000 | Lee et al. | |
| 6,105,148 A | 8/2000 | Chung et al. | |
| 6,332,200 B1 | 12/2001 | Meth et al. | |
| 6,405,315 B1 | 6/2002 | Burns et al. | |
| 6,826,690 B1 * | 11/2004 | Hind | G06F 21/31 713/173 |
| 6,941,310 B2 * | 9/2005 | Ahad | G06F 17/3048 |
| 7,117,504 B2 * | 10/2006 | Smith | G06F 8/20 709/201 |
| 7,249,280 B2 | 7/2007 | Lamport et al. | |
| 7,426,653 B2 | 9/2008 | Hu et al. | |
| 7,783,610 B2 * | 8/2010 | Lin | G06F 17/30362 707/689 |
| 7,792,980 B2 | 9/2010 | Eshel et al. | |
| 7,937,616 B2 | 5/2011 | Armstrong et al. | |
| 8,006,124 B2 | 8/2011 | Park et al. | |
| 8,037,186 B2 * | 10/2011 | Dumitriu | H04L 67/1029 709/226 |
| 8,108,712 B1 | 1/2012 | Carlino et al. | |
| 8,108,733 B2 | 1/2012 | Richmond | |
| 8,245,128 B1 * | 8/2012 | Ahad | G06F 17/30902 205/208 |
| 8,654,650 B1 * | 2/2014 | Vermeulen | G06F 17/30362 370/241 |
| 8,694,639 B1 * | 4/2014 | Vermeulen | G06F 9/5011 709/226 |
| 8,719,432 B1 * | 5/2014 | Vermeulen | G06F 9/526 707/704 |
| 8,862,642 B1 * | 10/2014 | Hamel | G06F 17/30194 707/821 |
| 9,171,019 B1 * | 10/2015 | Donlan | G06F 17/30362 |
| 2002/0099719 A1 * | 7/2002 | Schwitters | G06F 17/30067 |
| 2003/0187927 A1 | 10/2003 | Winchell | |
| 2003/0217081 A1 * | 11/2003 | White | G06F 12/0813 |
| 2004/0153841 A1 | 8/2004 | Beck | |
| 2006/0136781 A1 | 6/2006 | Lamport | |
| 2006/0179059 A1 | 8/2006 | Reed et al. | |
| 2007/0168516 A1 * | 7/2007 | Liu | G06F 17/30578 709/226 |
| 2007/0174541 A1 | 7/2007 | Chandrasekaran et al. | |
| 2008/0208938 A1 * | 8/2008 | Lin | G06F 17/30362 |
| 2008/0228864 A1 * | 9/2008 | Plamondon | G06F 17/30902 709/203 |
| 2008/0320151 A1 * | 12/2008 | McCanne | H03M 7/30 709/228 |
| 2009/0113034 A1 * | 4/2009 | Krishnappa | G06F 15/16 709/223 |
| 2009/0276483 A1 * | 11/2009 | Lind | G06F 9/466 709/201 |
| 2009/0287720 A1 | 11/2009 | Herter et al. | |
| 2009/0327807 A1 | 12/2009 | Varadarajan et al. | |
| 2010/0023521 A1 | 1/2010 | Arcese et al. | |
| 2010/0161573 A1 * | 6/2010 | Chan | G06F 17/30362 707/704 |
| 2011/0185010 A1 * | 7/2011 | Shatsky | H04L 65/80 709/203 |
| 2012/0066399 A1 * | 3/2012 | Marquardt | H04L 69/162 709/228 |
| 2013/0124595 A1 * | 5/2013 | Oplinger | H04L 12/00 709/201 |
| 2013/0304708 A1 * | 11/2013 | Ritchie | G06Q 30/02 707/687 |
| 2014/0012938 A1 * | 1/2014 | Ghandeharizadeh | H04L 67/2852 709/213 |

OTHER PUBLICATIONS

DeCandia G, Hastorun D, Jampani M, Kakulapati G, Lakshman A, Pilchin A, Sivasubramanian S, Vosshall P, Vogels W. Dynamo: amazon's highly available key-value store. ACM SIGOPS Operating Systems Review. Oct 14, 2007;41(6):205-20.*

Cooper, B.F. et al. "PNUTS: Yahoo's Hosted Data Serving Platform," Proceedings of the VLDB Endowment 1.2 (2008), 1277-1288.*

Bell Laboratories—"UNIX Programmers Manual" Seventh Edition vol. 1, Jan. 1979, Date Instruction.*

"Future (Java 2 Platform SE 5.0)," 2004/2010 Oracle and/or its Affiliates, downloaded from docs.oracle.com/javase/1.5.0/docs/api/java/util/concurrent/Future.html, pp. 1-4.

"Paxos Made Live—An Engineering Perspective," Chandra, et al., Jun. 20, 2007, pp. 1-16.

"The Chubby lock service for loosely-coupled distributed systems," Mike Burrows, Google, Inc., pp. 335-350. Year of Publication: 2006, ISBN:1-931971-47-1.

"Paxos Made Simple," Leslie Lamport, Nov. 1, 2001., pp. 1-14.

"Restoring Consistent Global States of Distributed Computations," Goldberg, et al., 1991 ACM. pp. 1-11.

"Transparent Checkpoint-Restart of Distributed Applications on Commodity Clusters," Laaden, et al., Appears in Proceedings of the 2005 IEEE International Conference on Cluster Computing (Cluster 2005), Boston, MA, Sep. 26-30, 2005. pp. 1-13.

"Distributed Checkpointing: Analysis and Benchmarks," Gustavo M. D. Vieira and Luiz E. Buzato, Partially supported by CAPES under grant No. 01P-15081/1997. pp. 1-16.

U.S. Appl. No. 12/771,851, filed Apr. 30, 2010, Allen H. Vermeulen et al.

U.S. Appl. No. 12/771,861, filed Apr. 30, 2010, Allen H. Vermeulen et al.

U.S. Appl. No. 13/528,340, filed Jun. 20, 2012, Long X. Nguyen.

* cited by examiner

COMPUTING AND TRACKING CLIENT STALENESS USING TRANSACTION RESPONSES

BACKGROUND

Distributed software applications may comprise multiple concurrent and often autonomous processes, communicating with one another and/or with shared resources across one or more networks. For example, a distributed storage service may include multiple concurrent processes executing across a distributed hardware infrastructure, such as one or more clusters of computers. Various ones of these processes may be executing on different physical and/or logical (e.g., virtual) machines in the cluster(s). In a storage service, for example, processes (e.g., software servers) on different machines may each expose a programmatic interface to clients, which the clients may use to access a single, virtual file system that may be implemented across multiple storage resources. The storage service may store multiple replicas of each data item in the system, such that any change to a data item on one server must be propagated to one or more other servers.

In a distributed storage system in which multiple clients can update stored data, the data received from the system may always be considered "stale". For example, by the time one client receives a response to a request to read a data item from one of the servers, another client may have already updated the data item on another one of the servers. In such systems, it may be useful for the client to know just how stale its data is, i.e., approximately how long it has been since any data read by the client was known to be valid. Some existing systems use a heartbeat protocol to determine the staleness of a client machine and a separate transaction protocol to effect and propagate changes in the stored data or the shared state of the system on various servers in the system. Synchronizing these processes can be complex and error-prone, and does not result in a method for computing and tracking the staleness of any particular data items in a meaningful way.

Figure 1:
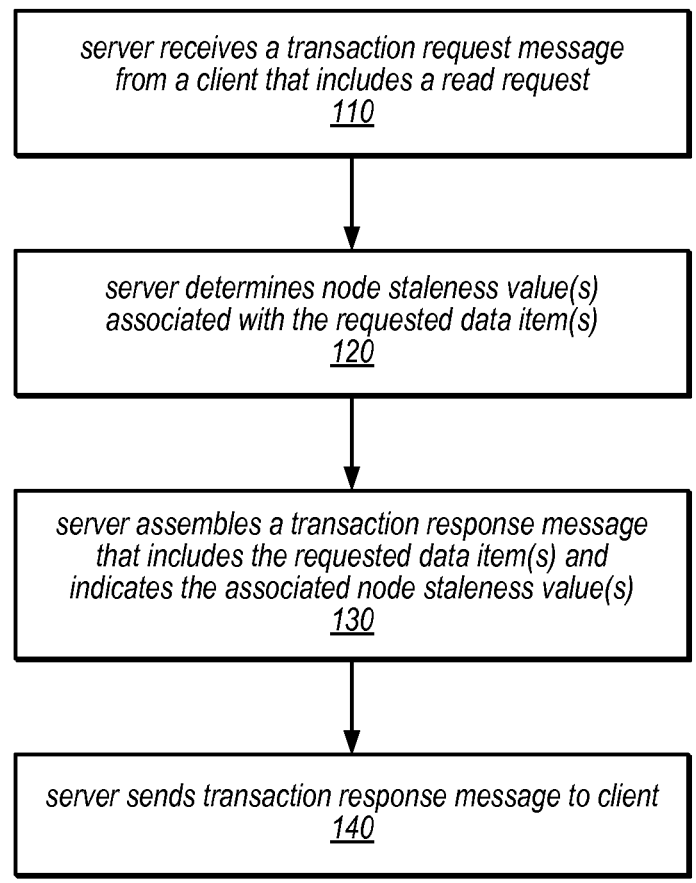
FIG. 1 is a flow diagram illustrating one embodiment of a method for implementing a transaction-based staleness protocol between clients and servers, from the perspective of a server.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

As noted above, the data items and/or shared state that is maintained in a distributed system in which multiple clients can update the data/state may always be considered stale once it has been received by a client. Existing systems that employ a heartbeat protocol to determine the staleness of the client machines and a separate transaction protocol to effect and propagate changes in the stored data or the shared state of the system on various servers in the system do not compute and track the staleness of any particular data items in a meaningful way. In fact, allowing these processes to operate independently can result in inefficiencies or even incorrect behavior in the distributed system. However, efforts to synchronize these processes have yielded mixed results, are difficult to implement, and are error-prone.

The systems described herein may employ a transaction-based protocol for computing and tracking staleness on a client machine in a client-server architecture. In various embodiments, these systems may compute client staleness on a per-transaction basis, and may tie the computed staleness values to particular data items that are resident on the client. In other words, when a client receives a change to its state from a server (e.g., a transaction response), the client may be able to compute the staleness of the new state using information received from the server in the transaction response. In general, the terms "staleness" and/or "staleness value" may be used to refer to an actual, estimated, or assumed age of one or more data items from a particular perspective, e.g., the elapsed time since the data item(s) or a state associated with the data item(s) was last updated in the system. For example, the term "node staleness value" may refer to a value that represents an upper bound on the amount of time that has elapsed since the corresponding data items (or a state associated with the data items) were known (or assumed) by a server node to be valid. In some embodiments, this value may be expressed in units of time (e.g., 1 second, 2 seconds, or 30 seconds). Similarly, the term "client staleness value" may refer to a value that represents an upper bound on the amount of time that has elapsed since the corresponding data items (or a state associated with the data items) were known (or assumed) by a client to be valid.

Note that in some embodiments, the point in time at which a data item (or state information associated with a data item) is known or assumed to be valid may correspond to the time at which the data item (or state information) was initially stored (if it has not yet been updated), or the time at which the data item was most recently updated. In other embodiments, the point in time at which a data item (or state information associated with a data item) is known or assumed to be valid may correspond to the time at which a master copy of the data item or state information was most recently read. For example, some systems maintain one copy of each data item that is considered the authoritative version of the data item (e.g., on a master replica), and this copy may be assumed to be valid at all times. In such systems, all other copies of the data item (e.g., on other replicas) may be considered shadows of the master copy, and a staleness value associated with each of these shadow copies may indicate the time that has elapsed since the copy was known to match the master copy (e.g., since it was copied from or compared to the master copy). In still other embodiments (e.g., in fault tolerant systems), multiple copies of each data item may be stored on different computing nodes, but no single copy may be considered to be an authoritative copy of the data item. In these embodiments, a version of a data item may be assumed to be valid if it matches a version designated as the authoritative version by a majority vote of the computing nodes. In these embodiments, a staleness value associated with a particular copy of the data item (one that matches the version designated as the authoritative version by a majority vote) may reflect the elapsed time since the most recent vote was taken. Note that in various embodiments, any of a variety of other methods may be employed for determining when and if a stored data item or stored state information is valid and/or for determining staleness values for specific copies of that data item or state information on one or more computing nodes. For example, in systems that employ erasure coding, an individual data item may not be stored as a single, complete entity. Therefore, the point in time at which the stored data item is known or assumed to be valid may be dependent on when, how, and/or how often the data item is encoded into or reconstructed from multiple data shards, and/or when, how, and/or how often those shards are stored, updated, or otherwise validated on multiple computing nodes.

In some embodiments, distributed systems that maintain data items or state on multiple server nodes (e.g., a storage system or lock service) may receive transaction requests from clients that include read requests and/or write requests. If a transaction request received by a particular one of the server nodes includes a read request, the server node may be configured to determine a node staleness value for the requested data from the perspective of the server node, and to return a transaction response to the client that includes both the requested data and the node staleness value. Upon receiving the transaction response, the client may compute a client staleness value for the requested data dependent on the node staleness value included in the transaction response, rather than on a separate heartbeat process.

In some embodiments, if the transaction also includes a write request, the server node may be configured to return the transaction response for the read request without waiting for the write to be committed in the system. In such embodiments, the client may compute a client staleness value for the requested data (i.e., the read data it receives) but the client may not be able to use the requested data until and unless the client receives another transaction response from the client indicating that the write has been successfully committed in the system. For example, in some embodiments, the client may be configured to refrain from using the requested data (or may be prevented from using the requested data) until and unless it receives such an indication, because it may not be until such an indication is received that the client will know that the transaction has succeeded and that the requested data (i.e., the read data it has received) is valid in the context of the transaction as a whole.

As previous noted, in order to compute staleness of a client machine in a client-server architecture, some existing systems execute a heartbeat protocol. In a heartbeat protocol, the client sends a heartbeat message periodically (e.g., once every second) and the server responds to that heartbeat message. Based on the server response, the client can compute its staleness. For example, in a distributed system that provides a lock service, a client may include a timestamp of a local clock in a heartbeat message sent to the collective that implements the lock service (e.g., a cluster of server nodes). If the lock service has not already revoked the client's locks, the server node receiving the heartbeat from the client may respond with a confirmation that the collective has not revoked the client's locks. In response to receiving a confirmation from the server that the client's locks are not revoked, the client may calculate a maximum period of time for which it is safe to use its locks. Each time the client receives subsequent confirmations from the collective, the client may recalculate this safe time. If the safe time elapses and the client has not received subsequent confirmations from the collective, the client may assume that its locks have been revoked and may not rely on the locks for accessing protected resources.

However, in these existing systems, the confirmation that a server node sends to a client may contain somewhat outdated (i.e., stale) information. For example, by the time the client receives a confirmation from a server node, the data in the confirmation is older than it was when the server node constructed the message. This time period may contribute to a client staleness value. Additionally, because the lock service is a distributed application, the data used by the particular server node to construct the message received by the client may itself be dated with respect to the shared-state of the collective. In this example, this staleness may be referred to as node staleness. In some systems, the server node may echo the client timestamp contained in a heartbeat message back to the client, such as by including it in the heartbeat response message. When the client receives the heartbeat response message, it may determine that the message was constructed no earlier than the time indicated by that echoed timestamp. The client can therefore determine that the client staleness of its data is no greater than the client's current clock value minus the echoed timestamp. Thus, the client may determine an upper bound on the client staleness. However, this upper bound on client staleness is not tied to any particular data on the client, and might or might not reflect the true HI staleness of data received by a client. Instead, the client staleness computed using a heartbeat protocol is a general staleness of the state of the client. Note that in these existing systems, the heartbeat protocol may be a simple request-reply protocol that is is wait-free, as the client (requestor) does not need to wait for a heartbeat response. Rather, the heartbeat response can arrive at any time, and the client would need to reconcile the arrival of the heartbeat response with information it has obtained through other means in order to determine the staleness of any particular data on the client.

As noted above, in some existing client-server systems, the heartbeat protocol is executed independently from a protocol that effects and propagates transactions in the system. For example, these systems may employ a separate transaction protocol that is implemented as another simple wait-free request-reply protocol. In one example of a transaction protocol, the client sends a transaction request to the server, and the server sends back a transaction response that indicates the transaction results and outcome as soon as it can. The server may also send a stream of update messages to the client, and these update messages may include notifications for the client about various changes happening inside the server. In such systems, the transaction responses and update messages may provide the client with information about changes to the data that the client has received and/or changes to shared state in the collective. In some embodiments, the client staleness values computed using the heartbeat protocol may be associated with the most recent transaction, regardless of how long ago that transaction was executed or whether any particular data items were read or written by that transaction.

In an existing system that employ a transaction protocol and a separate heartbeat protocol, failure to carefully synchronize the heartbeat protocol with the transaction response and update streams may result in incorrect behavior in the system. In one example, failure to synchronize these protocols may result in an incorrect client staleness computation, in which a client thinks that its data is not stale when in fact it is stale. In this example, when the system computes the staleness of a server (i.e., the node staleness), there is a clear correlation between the computed node staleness and how far behind the server's copy of the shared state is from the shared state of the collective (because the node staleness is computed based on the propagation and backlog of transactions). However, when the system computes the staleness of the client, there is a disconnect between the computed client staleness and how far behind the client's copy of the shared state is from the shared state of the collective. This is because the client state is updated based on the transaction responses messages and update messages it receives, but its staleness is computed based on the heartbeat protocol. Therefore, even if the client's copy of the shared state is very far behind the state of the collective, its computed client staleness value may be very low, as long as the heartbeat protocol is being maintained.

In another example, failure to synchronize the transaction and heartbeat protocols in existing systems may result in an incorrect operation of a transaction expiration protocol, such that a client assumes that a transaction has expired even though the cluster has actually committed it. This may occur in existing systems in which the client and the server can independently make a decision to expire a transaction (which works well even when network failures do not allow a client and server to communicate with each other), but the client (using a cluster clock that is tied to the heartbeat protocol rather than the transaction protocol) makes a local decision to expire the transaction which the collective (using a cluster clock that is tied to the transaction protocol) may not have decided to expire.

In yet another example of incorrect behavior due to a failure to synchronize a transaction protocol and a separate heartbeat protocol, a distributed system that implements a lock service may employ both of these protocols. In this example, if the transaction channel is choked (e.g., if the backlog of transactions is high), and the server has sent a "lock revoked" message to the client but the client has not yet revoked it (e.g., because the message has been dropped in the overloaded transaction channel or simply because the client has not yet received and applied the message), the client may continue to access resources protected by the lock even though it no longer holds the lock. In this example, the client may believe that the resources are still protected by the lock and will not be accessed (or modified) by another client. However, since the client does not actually hold the lock, this may not be true.

Other potential sources of error in distributed systems that employ both a transaction protocol and a separate heartbeat protocol may be caused by the fact that these existing protocols do not guarantee the ordering between the different types of messages that a client can receives and that can indicate the outcome of a transaction (e.g., transaction response messages, update messages, and heartbeat response messages).

In addition to providing sources of error, the use of both a transaction protocol and a separate heartbeat protocol may result in inefficiencies in a distributed system, e.g., in systems in which individual clients access the servers in the system only occasionally, and typically perform only one or a small number of transactions (e.g., a single read or write transaction) when they do. In such systems, the client may have to maintain a persistent connection with a server in the system (or at least maintain a connection with the server much longer than would be necessary to perform a single transaction) in order to execute the heartbeat protocol before disconnecting. Otherwise, the client would not have a way to compute its staleness. However, maintaining these connections can be expensive, especially for clients who only need to perform a simple transaction.

Unlike in existing systems that employ both a transaction protocol and a separate heartbeat protocol, in some embodiments the systems described herein may allow computation of client staleness values that tied to the particular data items read by the client, rather than simply to the client or to the most recent transaction (which may have targeted different data) using information included in the transaction responses and/or in update messages themselves. In other words, rather than relying on two different protocols that are implemented in two different logical channels (a heartbeat protocol channel and a transaction or data channel), the systems described herein may use transaction messages to determine client staleness, thus eliminating the need for the heartbeat protocol and its corresponding logical channel.

In some embodiments, the systems described herein may support the use of a pre-determined maximum staleness tolerance parameter (e.g., on the client) whose value indicates the maximum staleness that can be tolerated by the client. In such embodiments, prior to using a data item that was previously read by the client, the client may compute the current client staleness value associated with the data item and compare it to the pre-determined maximum staleness tolerance value. If the maximum staleness tolerance has been exceeded, the client may not use the previously read data item, but may send another request to the server to read the data item. In this way, the client may obtain a fresher copy of the data item (e.g., a copy of the data item for which the computed client staleness value does not exceed the maximum staleness tolerance value). In some embodiments, computing the current staleness value for a data item may include adding a value representing the elapsed time since an initial client staleness value for the data item was computed (e.g., when a response message from the server that included the data item was received) to the initial client staleness value. In some embodiments, the initial client staleness value may be computed by adding a value representing the time that elapsed between the client sending of the read request and the client receiving the response message from the server to the node staleness value included in the response message from the server.

In some embodiments, if a transaction request includes both data reads and data writes, the systems described herein may split the transaction into two or more processes. In such embodiments, the data reads may be performed quickly (e.g., using reads performed locally on the server that received the transaction request) and corresponding responses may be returned that include node staleness values. In other words, the server that received the transaction request may optimistically return response(s) for the reads of the transaction before the writes of the transaction are committed (i.e., without waiting for the writes to commit on the server that received the transaction request or on any other servers to which replicas of the write data are propagated). In the meantime (e.g., in the background or using another process), the writes of the transaction may be performed on multiple servers/replicas. In some embodiments, once all of the writes of the transaction are committed on all applicable replicas, the server that received the transaction request may send another response message to the client indicating that the writes were successfully committed and/or that the transaction as a whole has been committed (i.e., that the transaction has succeeded). In such embodiments, it may not be until this point that the client can consider the reads valid and can begin using them. This is because if the writes of the transaction fail, the whole transaction must fail. In that case, the client may discard the received read data and may retry the entire transaction. In other words, in some embodiments, the client can use the first response to compute the client staleness values for the read data, but may not use the first response to validate the data that it read. In some embodiments, this approach to executing transactions (e.g., using separate read and write processes) may avoid artificially long round-trip request-response times (and thus artificially long client staleness values) for the reads of the transaction. In other words, this approach may help keep client staleness values low for the data the client has read.

One embodiment of a method for implementing a transaction-based staleness protocol between clients and servers, from the perspective of a server, is illustrated by the flow diagram in FIG. 1. As illustrated at 110, in this example, the method may include a server receiving a transaction request message from a client that includes a read request. For example, the transaction request may include a request to read one or more data items that are stored on the server. As described in more detail below, in some embodiments, the transaction request message may also include the value of a client-local clock or other indication of client-local time. In this example, in response to receiving the transaction request, the server may be configured to determine a node staleness value associated with the requested data item(s), as 120. In other words, the server may be configured to compute a staleness value that represents (from the perspective of the server) an upper bound on the amount of time that has elapsed since the data items (or a state associated with the data items) was known by the server to be valid, and this node staleness value may be expressed in units of time, e.g., 1 second or 30 seconds. In some embodiments, the server may compute a respective node staleness value for each of the requested data items. In other embodiments (e.g., if the requested data items represent a logical or physically grouping of data, such as a row or column of data), the server may compute a single node staleness value for the requested group of data items representing an upper bound on the staleness of the group of data items (e.g., the upper bound on the staleness of the oldest data item in the group or of a state associated with group of data items).

As illustrated in this example, the method may include the server assembling a transaction response message that includes the requested data item(s) and that also indicates the associated node staleness value(s), as in 130. In other words, in contrast to systems in which staleness is computed using a heartbeat protocol that is distinct from the protocol by which transactions are performed, the systems described herein may include staleness-related information in transaction requests and/or responses. As illustrated at 140, the method may then include the server sending the assembled transaction response message to the client.

In some embodiments, computing the client staleness value may include the client sending a transaction request to the server. The client may add its local clock time (e.g., a local chip time) to the transaction request. After executing the transaction, the server may respond with a transaction response message that includes the transaction results (e.g., after it has sent all updates up to the time at which, according to the cluster lock, this transaction was executed). The server may echo the client's local clock time in the response to the transaction, and may also include the server node staleness in the response (i.e., the server node staleness value at the time of execution of the transaction). In some embodiments, when the client receives the transaction response message, it may compute an initial client staleness value using the following formula:

> initial client staleness=(client's current local time−
> echo of the client's local time from the last
> transaction response message for this transaction+server node staleness value from the last
> transaction response message for this transaction)

Note that if a client does not perform transactions very often, its client staleness values may climb. In some embodiments, in order to keep the staleness low, the client may employ one of these two approaches:
1. Send a simple no operation (NOP) transaction after every X ms (where X is configurable), regardless of the other transactions the client is executing on the cluster.
2. Send a simple no operation (NOP) transaction after every X ms of inactivity (where X is configurable). This approach may be more efficient for clients that are executing transactions on the cluster anyway.

Figure 2A:
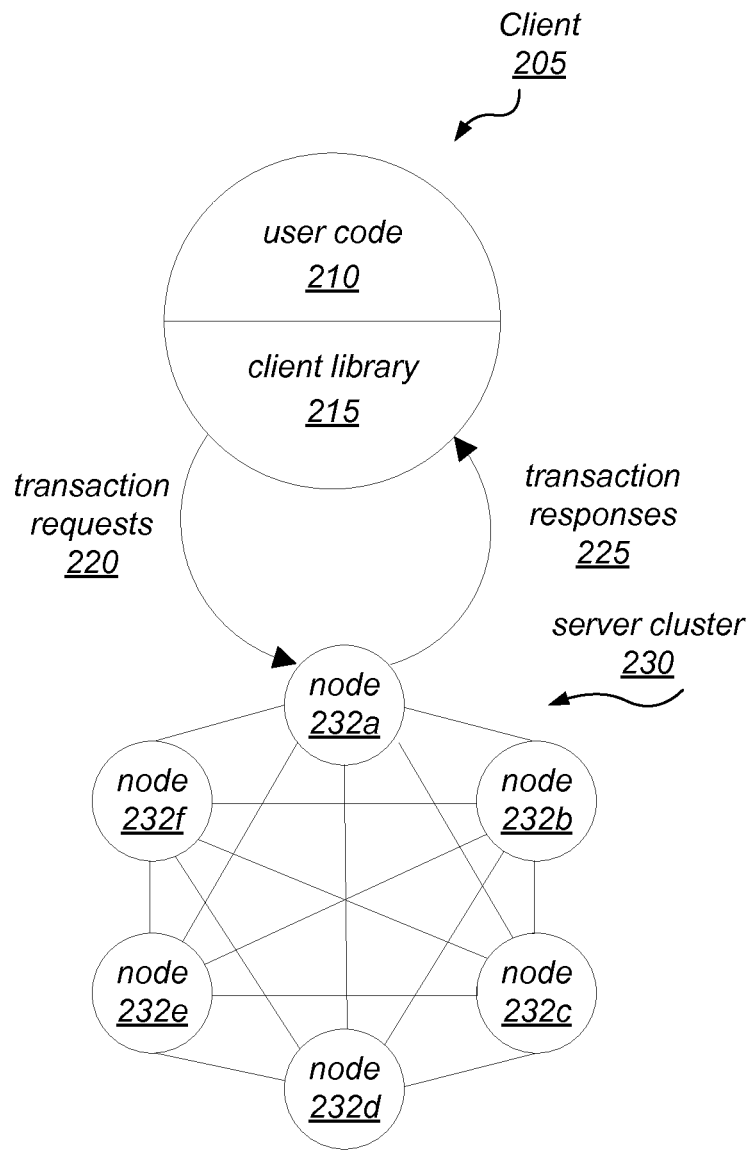
FIG. 2A is a block diagram illustrating various components of a distributed system that employs a transaction-based staleness protocol, according to some embodiments.

FIG. 2A illustrates various components of a distributed system that employs the transaction-based staleness protocol described herein, according to some embodiments. In the illustrated embodiment, client 205 may be any program, or part of a program, that is configured to communicate with a server cluster 230 (or one or more nodes 232 of such a cluster) in order to perform transactions. For example, client 205 may be a node of a distributed storage service application that is configured to receive customer requests over a network and in response, perform various functions on behalf of those customers. In some embodiments, client 205 may correspond to one or more computer systems configured to implement the features discussed below.

In the illustrated embodiment, client 205 comprises user code 210 and client library 215. Client library 215 may be a software library that exposes a programmatic interface to user code 210 for interacting with server cluster 230 (and/or various nodes 232 thereof) according to the transaction-based protocols described herein. In various embodiments, the user code 210 may invoke various methods of the client library 215 to interact with server cluster 230 (and/or various nodes 232) over a network, access different constants and/or variables of client library 215, and/or otherwise access data and functionality of the client library 215. In some embodiments, the client library may read data from server cluster 230 (and/or various nodes 232) and/or update data in server cluster 230 (and/or various nodes 232).

According to the illustrated embodiment, client 205 (in addition to various other clients) may communicate with server cluster 230 (and/or various nodes 232) to participate in a synchronization protocol with other clients and/or between client 205 and server cluster 230 (and/or various nodes 232). In some embodiments, client 205 may keep a cache of data recently received from server cluster 230 (and/or various nodes 232), a clock, and indications of requests submitted to the server cluster 230 (and/or various nodes 232) on behalf of one or more customers, and/or may invoke methods of client library 215 to read metadata (e.g., metadata associated with data items stored by server cluster 230 on one or more nodes 232) from server cluster 230 (and/or various nodes 232).

Since the storage system is distributed in nature, it may be implemented across multiple nodes, such as server cluster 230 (and/or various nodes 232). In some embodiments, each node 232 may be a different physical and/or virtual machine. In other embodiments, two or more of nodes 232 may be different software instances executing on the same physical or virtual machine.

As illustrated in FIG. 2A, a client such as 205 may communicate with server cluster 230 via a node of the distributed system, such as one of nodes 232a-232f. In various embodiments, different clients may communicate with different nodes. The particular node chosen by a client may depend on the identity of the client, the type of request, and/or other factors. In some embodiments, a client may maintain affinity to a given node once communication and/or another relationship has been established. It may also be possible for a client that has established affinity with a first node of server cluster 230 to switch to another node at any time. This may be done arbitrarily, in response to a node failure, in response to the node becoming overloaded, in response to a scheduler component indicating that the client should switch to another node, and/or in response to various other events.

As shown in the illustrated embodiment of FIG. 2A, the various nodes 232 of server cluster 230 may communicate with one another via network connections. These network connections may be implemented using various types of networks (e.g., Myrinet, Ethernet, Gigabit Ethernet, etc.) in various topologies (e.g., ring, grid, Torus, bus, etc.).

For simplicity of explanation, many of the embodiments described herein comprise a distributed system implemented on a fully-connected cluster of computers, where each node 232 in the server cluster 230 is a different physical machine in the cluster, executes a separate instance of the node software for the distributed system, and can communicate directly with every other node 232 in the distributed system via a network connection. However, those skilled in the art will appreciate that various other configurations are possible using different physical and/or virtual machines, connected by different network types and/or topologies, as described above.

Figure 2B:
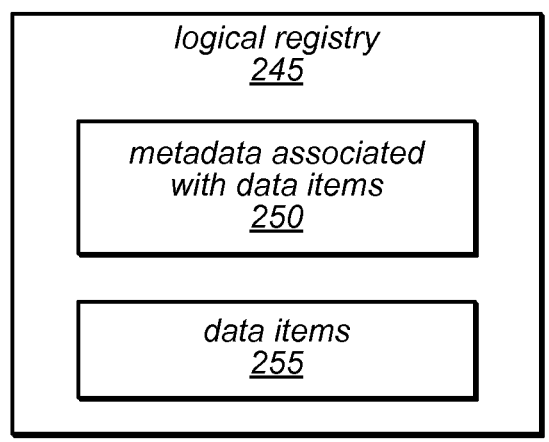
FIG. 2B is a block diagram illustrating a logical registry maintained by the distributed system illustrated in FIG. 2A, according to one embodiment.

In some embodiments, nodes 232 of server cluster 230 may work together to maintain a shared state in a logical registry, such as logical registry 245 illustrated in FIG. 2B. The logical registry is not necessarily a separate physical entity, but may be a logical entity that may be implemented across multiple nodes of the server cluster 230. For example, in some embodiments, each node 232 may keep a respective local copy of the logical registry as a local registry. Through a consensus protocol, the nodes of the server cluster 230 may agree on state transitions for each node to apply to its local registry, thereby collectively maintaining a single logical registry. In such embodiments, each node 232 may maintain a cached copy of the shared state that is valid as of the last transition.

In some embodiments, each transition may be associated with a cluster time, such as in a 64-bit integer agreed upon by the nodes of server cluster 230. This time may be a physical or logical time. Each node in the server cluster 230 may also maintain an independent system clock separate from the cluster time. Logical registry 245 may include information that may be accessed in a consistent manner by a plurality of the nodes. In some embodiments, the logical registry may include metadata 250 (which is associated with data items stored by one or more nodes of the cluster 230) and data items 255. In some embodiments, logical registry 245 may also include information regarding the state of various clients, such as whether the client is up or down (not shown). In some embodiments, server cluster 230 may maintain multiple logical registries. In such embodiments, each logical registry may be identified by a unique name. Different logical registries may be used to store data relevant to a corresponding set of clients, or relevant to different distributed applications.

In some embodiments, through a read transaction, a client may read information such as metadata, data items, and/or other information from the logical registry 245. Using a write transaction, a client may update information in the logical registry. In the example illustrated in FIG. 2A, for each transaction request 220 that is sent from a client 205 to server cluster 230 (and/or one of nodes 232), a corresponding transaction response 225 may be returned to the client (e.g., a response that includes any requested data items and/or communicates the results of any writes of the transaction). As illustrated in FIG. 1 and described in detail herein, transaction response messages 225 corresponding to read requests may include a node staleness value from which a client 205 may determine a client-local staleness value.

Each transaction may have different possible outcomes. For example, in some embodiments, these outcomes may correspond to success-write, success-read, abort, and fail. A success-write outcome may indicate that the transaction was executed successfully, all checks passed, and the registry updated. A success-read outcome may indicate that the transaction executed successfully but did not make any changes to the logical registry. An abort outcome may indicate that the transaction was aborted for some reason other than the particular contents of the transaction. In some embodiments, a transaction may be aborted and a reattempt of a transaction may be initiated (e.g., automatically by the system or explicitly by the client) for different reasons. A fail outcome may indicate that the transaction failed, for example, because one or more checks in the transaction failed, a write failed because a corresponding lock could not be obtained, the request contained a syntax error, and/or for various other reasons. In some embodiments, event notifications may be routed to one or more clients (e.g., the client from whom the transaction request was received or other interested clients) and/or between various nodes 232 of server cluster 230 indicating the outcome of various transactions.

As described above, clients such as client 205 may initiate transactions by communicating with a node (e.g., 232a) of the server cluster 230. Transactions may be used to read, insert, remove, and/or modify data stored in the logical registry. In some embodiments, a transaction may be specified using a stack-based language. Such a transaction may be specified in terms of data tokens and operations, where the data tokens are pushed directly onto a stack and the operations read their inputs from the stack and push results to the stack. After such a transaction is complete, the resulting stack may be sent to the client.

In some embodiments, the server cluster 230 may execute a failure detection service to detect failures among different nodes 232. For example, if a given node 232 in the server cluster 230 crashed or became otherwise unresponsive, the failure detection service may determine this. In some embodiments, a failure detection service may be executed across the collective in a distributed manner. In some embodiments, the failure detection service may also determine whether particular clients have become unresponsive, for example, dependent on transaction requests 220 and transaction responses 225 exchanged between server cluster 230 and various clients 205.

Figure 3:
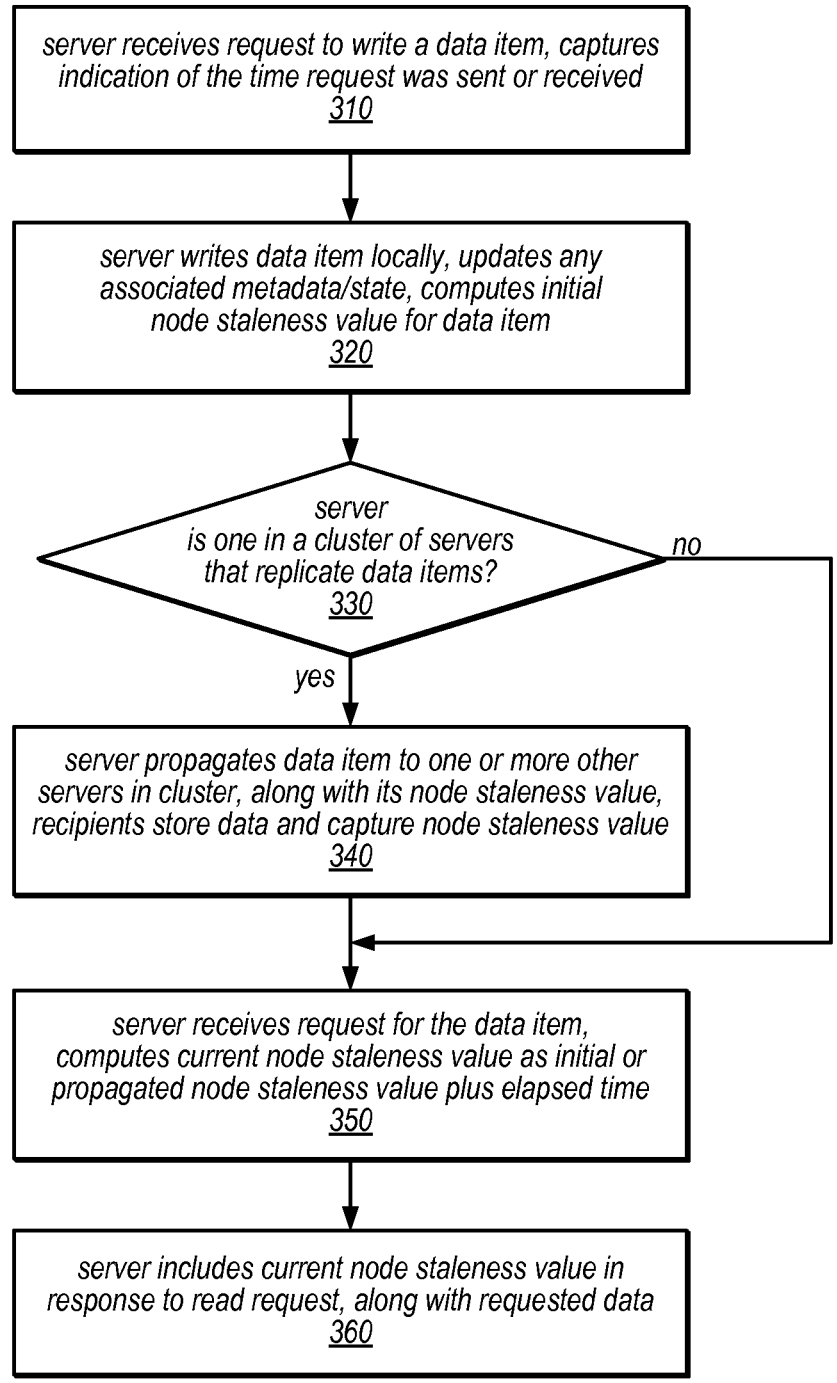
FIG. 3 is a flow diagram illustrating one embodiment of a method for computing a node staleness value, from the perspective of a server.

One embodiment of a method for computing a node staleness value, from the perspective of a server, is illustrated by the flow diagram in FIG. 3. As illustrated at 310, in this example, the method may include a server receiving a request to write a data item, and the server capturing an indication of the time at which request was sent and/or the time at which the request was received by the server. For example, in some embodiments, the request to write the data item (which may be a request to write a new data item to a server node or to update a data item stored on a server node) may include a client-local time indicating the time at which the request message was assembled or sent and this may be extracted from the request message by the server. In some embodiments, the server may capture the cluster-local time at which the request was received. One or both of these values may be maintained by the server and associated with the request (e.g., for at least as long as it takes to process and respond to the request).

As illustrated in this example, the method may include the server writing the data item locally (e.g., on the server node to which the request was routed), and the server updating any metadata and/or state information associated with the data item, as in 320. For example, in a system that implements a distributed lock service, the metadata may indicate the owner of a lock, or the state associated with a lock may indicate that the lock is "free", "pending", or "held". The server may then compute an initial node staleness value for data item (e.g., it may reset a node staleness value to an initial value, may express an initial staleness value from the perspective of the node as the time at which the request was received, or may compute an initial node staleness value as the time at which the request was received plus the time it took to store the data locally, in different embodiments).

If the server node to which the request was routed is one of a collection of nodes (e.g., in a cluster of server nodes) that replicate data items stored by the collection of nodes, shown as the positive exit from 330, the method may include the server node that received the request propagating the received data item to one or more other server nodes in the cluster along with the node staleness value that was determined by the server node to which the request was originally routed (as in 340), and the recipients storing the data item and capturing the node staleness value. Note that in some embodiments, each of the recipient server nodes in the cluster may compute their own node-local staleness value, dependent on the node staleness value propagated by the server to which the request was originally routed and/or the cluster time at which the recipient server node received the data item or stored the data item. If the server node to which the data item was originally routed is not a member of a collection of server nodes that replicate stored data, shown as the negative exit from 330, the data item may not be propagated to another server.

As shown in the example illustrated in FIG. 3, at some point after the data item is stored on one or more server nodes, the method may include a server receiving a request to read the data item, as in 350. For example, a read request for the data item may be received by the server node to on which the data item was originally written or on another node on which the data item was replicated. As illustrated at 350, in this example, the method may include the server that receives the read request computing a current node staleness value for the data item. For example, the current staleness value may be computed as the initial or propagated node staleness value plus the elapsed time (relative to the cluster clock) since the server that received the read request received or stored the data item locally. The method may include the server including the computed current node staleness value in its response to the read request, along with the requested data item, as in 360.

Note that while the flow diagram in FIG. 3 illustrates a method for determining a node staleness value for a single data item, in other embodiments the method may be applied to determine a node staleness value for a collection of related data items (e.g., a row or column of data). For example, if a row or column of data is written in response to a request to write or update all of the values in the row or column, a single staleness value may be computed for the row or column or may be associated with each of the data items in the row or column. In another example, the data items in a row or column of data may be written at different times and each may be associated with a respective node staleness value. In such embodiments, in response to a request to read one of the data items, a current node staleness value may be computed for that individual data item. However, in response to a request to read all of the data items in the row or column, a single node staleness value may be computed for the collection of data items that represents an upper bound on the staleness of the data item in the collection that has the highest node staleness value.

Figure 4:
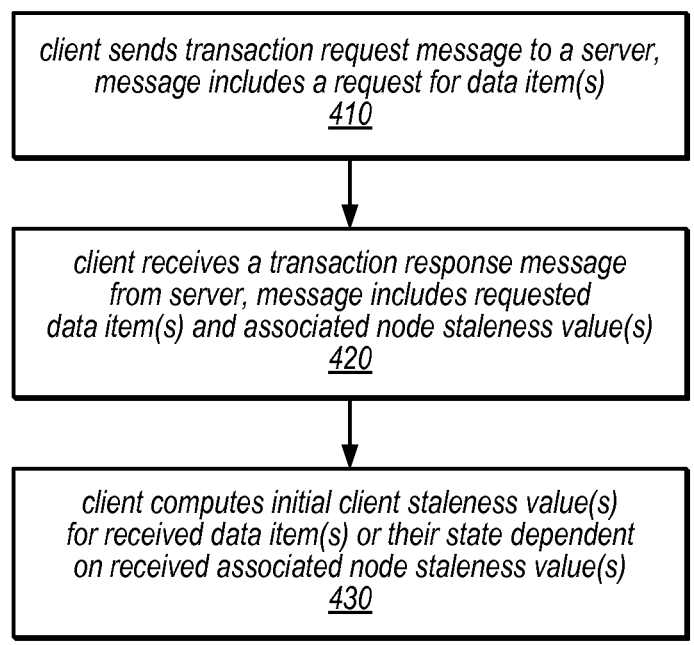
FIG. 4 is a flow diagram illustrating one embodiment of a method for implementing a transaction-based staleness protocol between clients and servers, from the perspective of a client.

One embodiment of a method for implementing a transaction-based staleness protocol between clients and servers, from the perspective of a client, is illustrated by the flow diagram in FIG. 4. As illustrated at 410, in this example, the method may include a client sending a transaction request message to a server, where the message includes a request for one or more data item(s). In other words, the transaction may include a read request targeting one or multiple data items (e.g., a row or column of data items) that are stored by the server. As described in more detail herein, in some embodiments, the transaction request message may include a client-local time representing the time at which the transaction was initiated (e.g., the time at which the transaction request message was assembled or sent to the server).

After the request has been handled by the server (e.g., as illustrated in FIGS. 1 and 3, and described above), the method may include the client receiving a transaction response message from the server, where the transaction response message includes the requested data item(s) and the node staleness value(s) associated with the data item(s), as in 420. As previously noted, the node staleness value associated with a data item may represent an upper bound on the amount of time that has elapsed since the data item or a state associated with the data item was known by the server node to be valid. As described above, the node staleness value(s) included in the transaction response message may include one node staleness value per returned data item, or may include a single node staleness value for collection of related data items (e.g., a column or row of data items), in different embodiments. Note also that in some embodiments in which a transaction request message from a client to a server includes a client-local time, this client-local time may also be included in the transaction response message.

As illustrated in this example, the method may include the client computing one or more initial client staleness values for the received data item(s) or their state dependent on the received associated node staleness value(s), as in 430. In other words, the client may compute a staleness value for the received data items (or their state) from the perspective of the client based on the staleness value that was included in the transaction response message and was computed from the perspective of the server node from which the data items were received. In some embodiments, the client staleness value may also be dependent on a client-local time that was included in the transaction request message and/or in the transaction response message. One embodiment of a method for computing (and using) a client staleness value is illustrated in FIG. 5 and described below.

Figure 5:
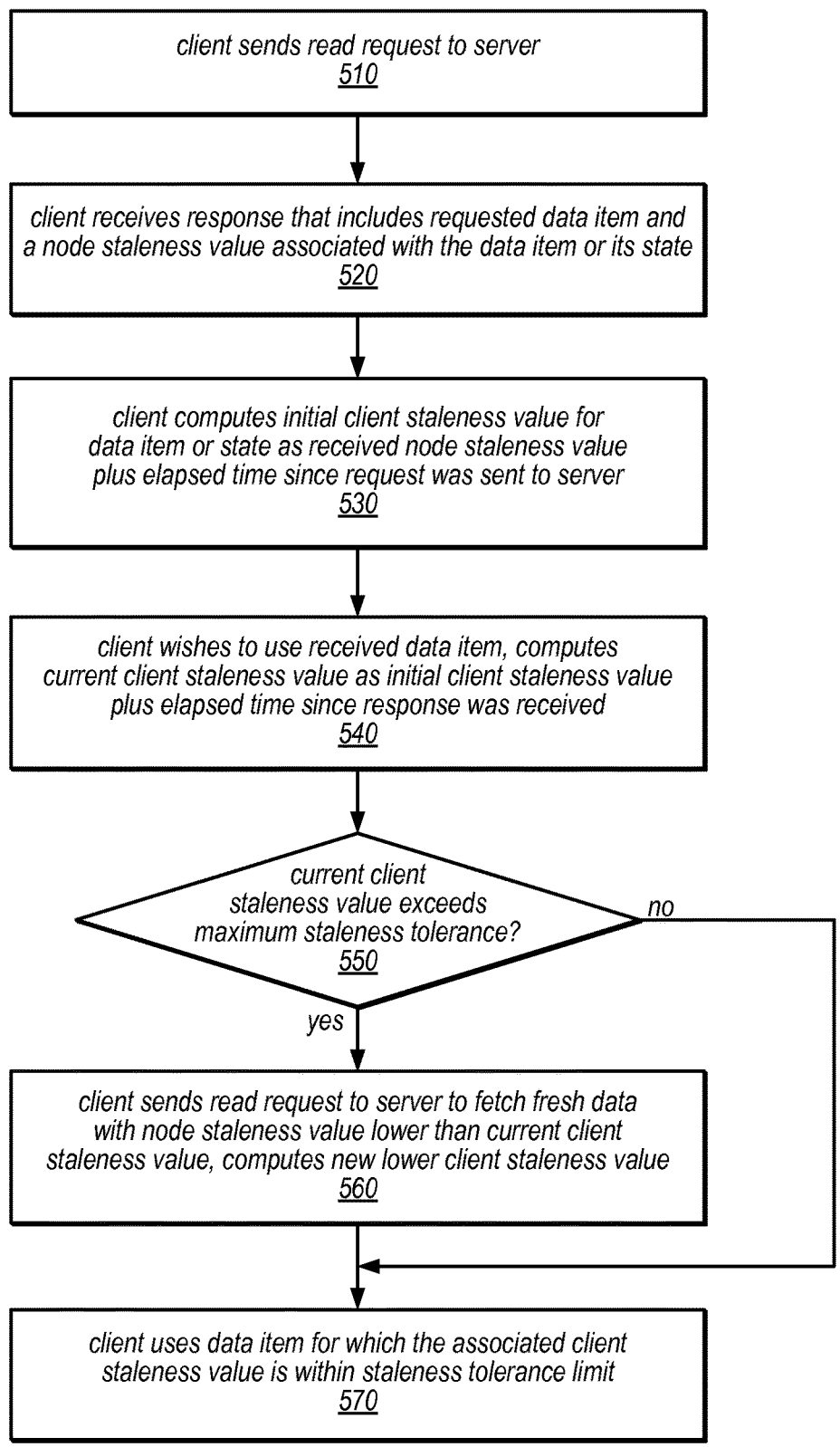
FIG. 5 is a flow diagram illustrating one embodiment of a method for computing and using a client staleness value.

One embodiment of a method for computing and using a client staleness value is illustrated by the flow diagram in FIG. 5. As illustrated in this example, the method may include a client sending a read request to a server, as in 510. For example, the client may send a transaction request to the server that includes a request to read a data item stored on the server. After the server processes the request (e.g., using any of the methods described herein), the client may receive a response that includes the requested data item and a node staleness value associated with the data item or its state (i.e., a staleness value for the data item or its state from perspective of the server), as in 520. Then client may then compute an initial client staleness value for the data item or its state as the received node staleness value plus elapsed time since request was sent to server (e.g., the round-trip time for the request and response, according to a client-local clock), as in 530.

As illustrated in this example, at some point in future, the client may wish to use received data item, and may compute a current client staleness value as the initial client staleness value plus the elapsed time since the response was received (or since the initial client staleness value was computed), as in 540. If the computed current client staleness value does not exceed a pre-determined maximum staleness tolerance value for the data item (shown as the negative exit from 550), the data item that was previously received may be used by the client (as in 570). Note that in various embodiments, the maximum staleness tolerance value may be a default value for the system, or may be configurable on an application, user, or data item basis. In some embodiments, the maximum staleness tolerance value may be set differently for different use cases and/or may be dependent on the type of service that is implemented by the distributed system, the reliability of the system hardware and/or network, or on other factors. For example, in embodiments in which there are intermittent hardware or network failures, setting the staleness tolerance threshold too low may result in a large number of false positives for a corresponding failure detection mechanism.

On the other hand, if by the time the client wishes to use the data item, the computed current client staleness value exceeds a pre-determined maximum staleness tolerance value for the data item (shown as the positive exit from 550), the method may include the client sending a read request to the server to fetch fresh data (e.g., to fetch a version of the data item with a node staleness value lower than the current client staleness value), and the client computing a new lower client staleness value when the fresh data is received, as in 560. The client may then use the freshly retrieved data item as needed (as in 570), assuming the new lower client staleness value is within the staleness tolerance limit. Note that the operations illustrated at 540-570 may be repeated (as needed) each time the client wishes to use a data item that was stored by and received from a server that maintains data on behalf of various clients and/or distributed applications.

Note that while several examples described herein include the computation of an initial client staleness value when a client receives a transaction response for a data read, in other embodiments, the client may not compute a client staleness value for a data item that it has read until it is ready to use the data item. In such embodiments, when the transaction response for the data read is received, the client may store the node staleness value that was included in the response, any echo of the client's local time when the transaction request was assembled and sent (e.g., one that was included in the transaction response or stored locally when the transaction request was assembled and sent) and an indication of the client's local time when the transaction response was received. When the client is ready to use the data that was read, the client may use this stored information and the client's current local time to compute a current client staleness value for the data item.

In some embodiments, the transaction request, transaction response, and update messages described herein may conform to an application programming interface defined for systems that employ the transaction-based staleness protocol described herein. In one embodiment, these transaction-related messages may be defined as follows.

Transaction request messages: A transaction message is sent by the client, and encodes the client's intent. A client can send a transaction message at any time after a connection is fully established with a server. Transaction request messages are not ordered, i.e., there is no guarantee that the server will receive the transactions in order in which they were sent by the client. It is also not guaranteed which server will receive a given transaction request message. A transaction request message may include any or all of the following elements, in different embodiments: a unique identifier for the transaction; an expiration time (e.g., a time in the cluster clock at which the transaction should be expired); the actual transaction code; an identifier of the language of the transaction code; and the client's local time.

Transaction response messages: A transaction response message (sometime referred to as a transaction results message) is a message sent by the server after it finishes executing a transaction requested by a client. Transaction response messages may be totally ordered by the cluster time, which is non-decreasing. Note that the server staleness value returned in a transaction response message is guaranteed to reflect the staleness of the server when the transaction was executed and not when it was received or responded to. This is an important guarantee when the client is using this staleness value to compute its own staleness. A transaction response message may include any or all of the following elements, in different embodiments: the unique identifier of the transaction; the value of the cluster clock when the transaction was executed; the results of the transaction execution; the transaction state (e.g., Submitted, Succeeded, Committed, RolledBack, Unknown, Pending or Failed); the transaction outcome (additional details about the transaction state); an echo of the client's local clock time that was included in the corresponding transaction request message; the staleness of the server on which the transaction was executed (e.g., the node staleness value); and a list of session paths associated with the transaction.

Update messages: An update message is sent by the server to indicate a change in the shared state of the cluster. More specifically, this message indicates the change in the shared state that the client is interested in. The update message stream is totally ordered by the cluster time, which is non-decreasing. Note that update messages are never dropped even when the client changes its physical connection from one server to another. Therefore, the update message stream can be viewed as coming from the cluster rather than from a particular server. Note also that the client is guaranteed to receive exactly one update message for every change in the registry it was connected to. An update message may include any or all of the following elements, in different embodiments: the unique identifier of the transaction; the value of the cluster clock when the transaction was committed; and a list of changes that happened due to the transaction (each of which includes an update type, an old value of a registry field, and/or a new value of a registry field).

In some embodiments, when user code on a client application intends to execute a given transaction on the logical registry of a server cluster (e.g., update one or more data items in the logical registry or update the logical registry to indicate that the client has acquired a given lock), it may first encode the transaction. The transaction may include one or more read data read operations and/or one or more write data operations. In some embodiments, encoding the transaction may involve invoking a client library on the client. In some embodiments, the client library may encode the transaction in a stack-based transaction language. After creating the encoded transaction, the client may wrap the transaction in the body of a transport message according to any suitable transport protocol, and submit the wrapped transaction to a node of the server cluster. In some embodiments, the client may contact any of a plurality of server nodes of the cluster. Upon receiving the wrapped transaction, the server node may unwrap the message and insert the encoded transaction into a queue in a transaction pipeline. In some embodiments, the nodes of a server cluster may share the same transaction pipeline. The instruction pipeline may then receive and parse the encoded transaction.

If the transaction contains any read operations targeting the logical registry, then the server node may process the read operations of the transaction locally, and may reply to the client with a status message and/or any data requested. If the transaction contains write operations, the server node may modify the shared state. A transaction that includes writes may be referred to herein as a modifying transaction. Since multiple server nodes maintain the shared state, the server node that received the request may apply the writes by initiating a consensus protocol (e.g., Paxos) among these multiple nodes of the collective before replying to the client with the result.

Many variations are possible for executing write operations to shared state using consensus protocols. In some embodiments, the receiving node may first execute the transaction locally without applying the write operations to the shared state and then, after all writes are known, apply the changes to the shared state via a consensus protocol. For example, as the node executes a transaction, the node may create a change request in addition to the normal stack. The change request may include a list of logical registry items read by the transaction execution (i.e., the read-set) and a list of writes to perform (i.e., the write-set). When the node finishes executing the transaction and the write-set is complete, then the modifications in the write-set may be made to the logical registry via a consensus protocol. In different circumstances, the server node may also confirm that various data items in the read-set have not been modified before committing the changes in the write-set. In some embodiments, if a transaction request includes both data reads and data writes, the systems described herein may split the transaction into two processes, as illustrated in FIG. 6 and described in more detail below.

Figure 6:
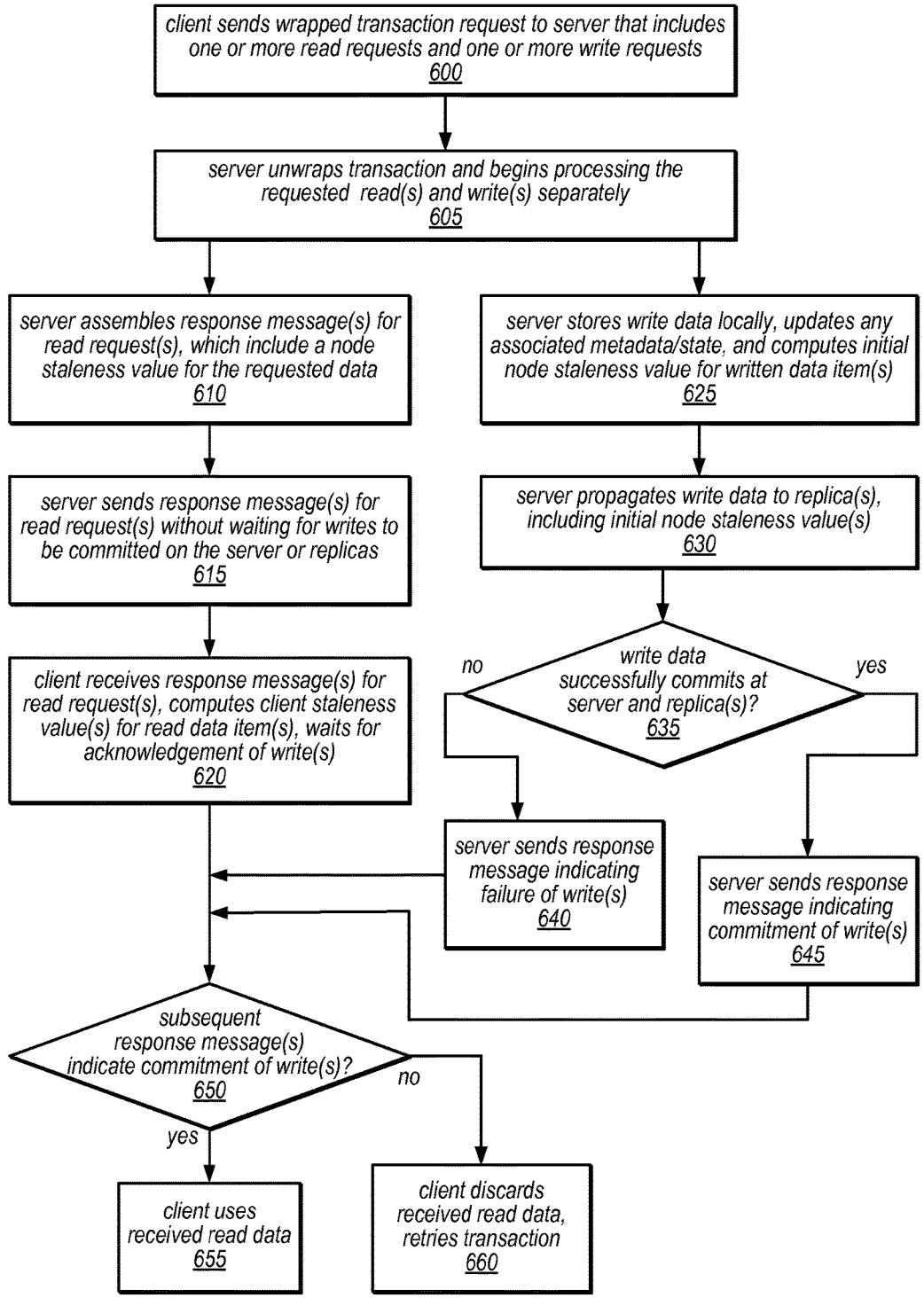
FIG. 6 is a flow diagram illustrating one embodiment of a method for processing transactions that include both read requests and write requests in a system that implements a transaction-based staleness protocol.

One embodiment of a method for processing transactions that include both read requests and write requests in a system that implements a transaction-based staleness protocol, as described herein, is illustrated by the flow diagram in FIG. 6. As illustrated at 600, in this example, the method may include a client sending a wrapped transaction request to a server that includes one or more read requests and one or more write requests. In various embodiments, the transaction request message may include any or all of the information described herein as being included in a transaction request message or may include different information. The method may include the server unwrapping the transaction and beginning to process the requested read(s) and write(s) separately, as in 605.

As illustrated in this example, the server may assemble one or more transaction response message(s) for the read request(s) that were included in the transaction, and each response message may include a node staleness value for the requested data, along with the requested data (as in 610). In various embodiments, the transaction response message(s) may include any or all of the information described herein as being included in a transaction response message or may include different information. The server may then send the assembled transaction response message(s) for read request(s) without waiting for the writes included in the transaction request to be committed on the server and/or on any replicas, 615. As illustrated in this example, the client may receive the response message(s) for the read request(s) of the transaction, may compute one or more client staleness value(s) for the read data item(s), and then may wait for an acknowledgement of the outcome of the write(s) of the transaction, as in 620. In other words, while the client may receive a relatively quick response to the read request(s) of the transaction, and may compute a relatively low staleness value for the data items that were read, the client may not be able to use the received data items until and unless the write(s) of the transaction are successfully committed on the server and/or on one or more replicas, if applicable.

As illustrated in this example, while the read requests are being processed, the server may begin processing the write request(s) in the transaction. For example, the method may include the server storing data items targeted by the write request(s) locally, updating any metadata and/or state information associated with the written data item(s) and computing one or more initial node staleness value(s) for the written data item(s), as in 625. The method may also include the server propagating write data to one or more replicas, as applicable, which may include propagating the initial node staleness value(s) along with the written data item(s), as in 630. If the data items being written successfully commit at the server and (if applicable) replica(s), shown as the positive exit from 635, the method may include the server sending one or more additional response messages to the client indicating the commitment of the write(s) of the transaction, as in 645. If the data items being written do not successfully commit at the server and/or (if applicable) replica(s), shown as the negative exit from 635, the method may include the server sending one or more additional response messages to the client indicating the failure of the write(s) of the transaction, as in 640. In some embodiments, these additional response messages may take the form of update messages, such as those described herein.

As illustrated in this example, if the additional response message(s) indicate the commitment of all of the writes of the transaction, shown as the positive exit from 650, the method may include the client using the received read data, as in 655. However, if the additional response message(s) indicate that not all of the writes of the transaction were committed (or that any of the writes of the transaction failed), shown as the negative exit from 650, the method may include the client discarding the received read data, and may also include the client retrying the transaction, as in 660. Note that in some embodiments, a client library that implements transaction request (such as client library 215) may automatically initiate reattempts of failed transactions in response to being notified of transaction processing failures.

The techniques described herein for implementing a transaction-based staleness protocol may have significant benefits as compared to previous approaches that are based a heartbeat protocol, or on both a heartbeat protocol and a separate transaction protocol. For example, these techniques may be used to efficiently perform individual transactions without the client having to maintain a connection with the server for a longer period than necessary to complete the transaction. In addition, these techniques may allow client staleness values to be tied to particular data items that have been read by the client. They may also allow clients to maintain state (e.g., a lock state, or a state of a particular data item) and to determine when the staleness of a data item has exceeded a maximum staleness tolerance value and should be replaced by a fresh copy. As previously noted, the described herein for implementing a transaction-based staleness protocol may be well suited for use in systems that implement a distributed storage service, a distributed lock service, or that otherwise maintain shared state that is accessible by one or more clients in a client-server architecture. Two of these use cases are illustrated in FIGS. 7 and 8 and described in more detail below.

As previously noted, in some embodiments, a client may communicate with a server (or a server cluster) to participate in a synchronization (i.e., locking) protocol with other clients. In some such embodiments, the client may keep a cache of data recently received from the server cluster, a clock, and indications of requests submitted to the server cluster on behalf of one or more customers, and/or may invoke methods of a client library to read lock metadata from the server cluster. For example, in some embodiments, the logical registry of a server cluster may include lock metadata, user entries, and/or information regarding the state of various clients, such as whether the client is up or down. Lock metadata stored in a registry may include locks, each identified by a respective path. User entries may include information stored to the logical registry by clients, such as information to be shared with other clients. For example, when creating a lock, a client may wish to write some metadata describing the lock into an entry of the logical registry. In some embodiments, such entries may include a name, value, creation time, and/or a modification time (e.g., the cluster time). Through a read transaction, a client may read information such as locks, entries, and/or named clients from the logical registry. Using a write transaction, a client may update information in the logical registry. In some embodiments, if a transaction targeting a lock, lock metadata, or a shared resource protected by a lock fails, this may be, for example, because one or more checks in the transaction failed, because a lock creation failed (e.g., if the lock already exists), because the request contained a syntax error, and/or for various other reasons.

Figure 7:
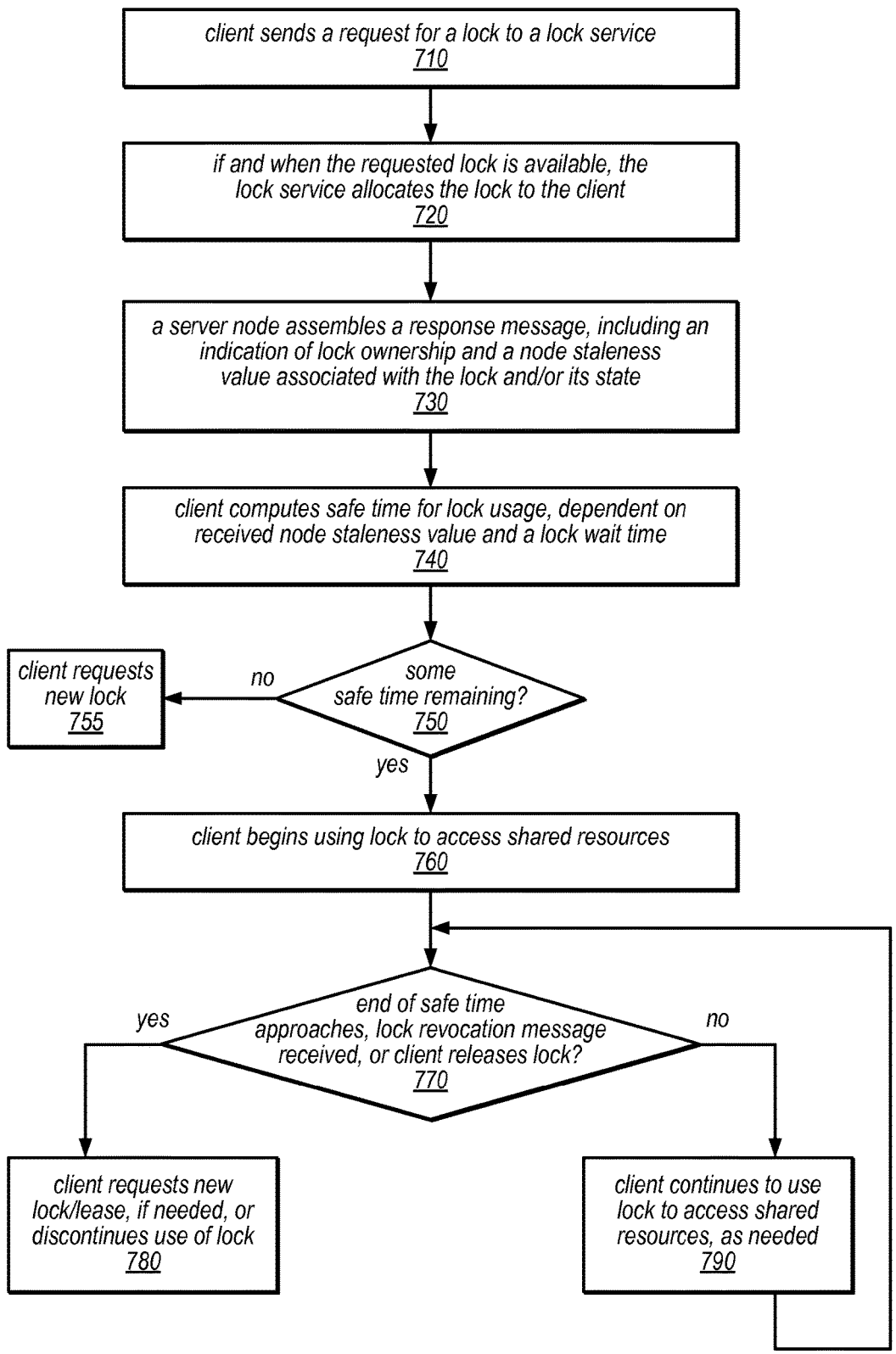
FIG. 7 is a flow diagram illustrating one embodiment of a method for implementing a lock service that employs a transaction-based staleness protocol.
Figure 8:
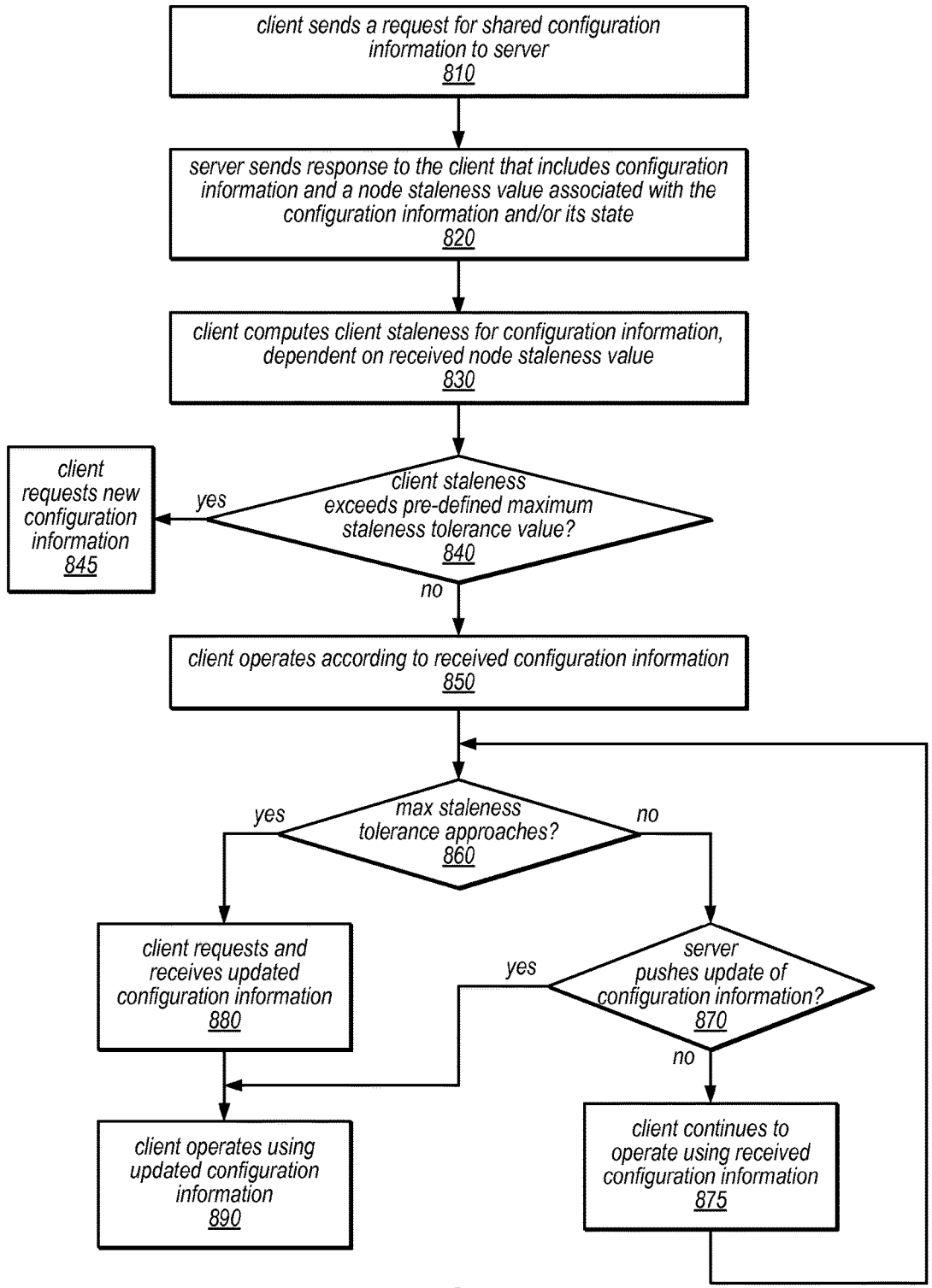
FIG. 8 is a flow diagram illustrating one embodiment of a method for managing shared configuration information in a system that implements a transaction-based staleness protocol.

One embodiment of a method for implementing a lock service that employs a transaction-based staleness protocol, as described herein, is illustrated by the flow diagram in FIG. 7. As illustrated at 710, in this example, the method may include a client sending a request for a lock to a lock service. In general, a lock may be a shared resource in the system that protects another shared resource (e.g., data items, a critical section of code, or another type of shared resource that can only be owned or accessed by one client at a time for reading and/or writing). For example, a client wishing to access a shared resource may request and obtain a lock on the shared resource, may perform some work involving the shared resource (e.g., reads, writes, and/or updates) under mutual exclusion, and then may release the lock. In this example, the client needs to maintain state (e.g., to know "I hold the lock" or "I don't hold the lock"). In some embodiments, the lock service may be a distributed lock manager implemented on multiple servers, as described above. As illustrated in this example, if and when the requested lock is available, the method may include the lock service allocating the lock to the client, as in 720. In various embodiments, allocating a lock may include creating a lock on a shared memory location or other resource, updating an ownership record associated with a shared memory location or other resource (e.g., to identify the client to which the lock has been allocated), or updating metadata associated with a shared memory location or other resource (e.g., updating metadata 250 associated with a stored data item 255 in a logical registry 245 to indicate that the lock has been allocated to the client).

As illustrated in this example, a server node of the distributed lock manager (e.g., a server node on which lock metadata and/or associated data items are stored) may assemble a response message, including an indication of the lock ownership and a node staleness value associated with the lock and/or its state, as in 730. For example, the response message may include an identifier of the lock that was allocated to the client, and/or an indication of the current state of the lock (e.g., "held"). In some embodiments, locks may be assumed to be held for at least pre-determined minimum amount of time (e.g., a "wait time") before they can be revoked and/or allocated to another client (barring a failure of the node on which the metadata for the lock is stored or another exceptional event). This wait time may be a default amount of time for the system or may be configurable on a system, application, lock, client, or shared resource basis, in different embodiments. In some embodiments, the wait time may be specified in the response message that indicates that the lock has been allocated to the client (e.g., the response may specify the amount of time for which a "lease" for the lock is valid). In some embodiments, the method may include the client computing a "safe time" for lock usage (e.g., a remaining amount of time for which the client can assume that the lock is valid) dependent on received node staleness value and the lock wait time, as in 740.

If there is no safe time remaining, shown as the negative exit from 750, the method may include the client requesting a new lock, as in 755. However, if there is some safe time remaining, shown as the positive exit from 750, the method may include the client beginning to use the lock to access the shared resources it protects, as in 760. Until the end of the safe time approaches, a lock revocation message is received, or the client releases lock, the client may continues to use the lock to access the shared resources it protects, as needed. This is illustrated by the negative exit from 770, element 790, and the feedback from 790 to 770. However, once the end of the safe time approaches, a lock revocation message is received, or the client releases lock (shown as the positive exit from 770), the method may include the client requesting a new lock (or a new lease on the lock), if needed, or may include the client discontinuing the use of the lock, as in 780.

Another use case for the transaction-based staleness protocol described herein is in managing shared configuration information (e.g., shared configuration data for a fleet of clients or servers). In some cases, managing shared configuration information may include managing group membership data. For example, shared group membership data may include data defining the members of the group, and data indicating the status of each of the members (e.g., whether they are up or down). In embodiments that implement a distributed storage service, the shared group membership information may include a partition map indicating the member(s) of the group on which particular data partitions are replicated. In some embodiments, the shared group membership information may change as the members of the group change. For example, group members may obtain and cache shared configuration data when they join the group. Subsequently, they may be configured to determine when a staleness value for the received configuration information exceeds (or approaches) a pre-defined upper bound on amount of staleness that can be tolerated in the system, and to attempt to locate the latest copy of the configuration information (e.g., one for which the staleness value does not exceed this pre-defined upper bound).

One embodiment of a method for managing shared configuration information in a system that implements a transaction-based staleness protocol, as described herein, is illustrated by the flow diagram in FIG. 8. As illustrated in this example, the method may include a client sending a request for shared configuration information to a server that maintains that information on behalf of a fleet of clients, as in 810. For example, the client may request and receive the shared configuration information from a server at boot up, at restart, or upon joining the fleet, in different embodiments. In various embodiments, the shared configuration information may include machine and/or software configuration information (e.g., version information for configuration files, configuration parameter values, and/or software) or group membership information (e.g., identifying members of the fleet). In response to receiving the request, the server may send a response to the client that includes the shared configuration information and a node staleness value associated with the configuration information and/or its state, as in 820. As in other examples described herein, the node staleness value may represent an upper bound on the amount of time that has elapsed since the configuration information and/or its state were known to be valid, from the perspective of the server.

As illustrated in this example, after the client receives the response from the server, the method may include the client computing a client staleness value for the configuration information and/or its state, dependent on received node staleness value, as in 830. If the client staleness value exceeds a pre-defined maximum staleness tolerance value (shown as the positive exit from 840), the method may include the client requesting new or updated configuration information (e.g., from one or more other members of the group or from the server), which may include fresh configuration information or an indication that the configuration information has been updated with a lower node staleness value, as in 845. In various embodiments, maximum staleness tolerance value may be a default amount of time for the system or may be configurable on a system, fleet, application, client, or configuration parameter basis, in different embodiments. As previously noted, in some embodiments, the maximum staleness tolerance value may be set differently for different use cases and/or may be dependent on the type of service that is implemented by the distributed system, the reliability of the system hardware and/or network, or on other factors. For example, in embodiments in which there are intermittent hardware or network failures, setting the staleness tolerance threshold too low may result in a large number of false positives for a corresponding failure detection mechanism. In some embodiments, the maximum staleness tolerance value may be specified in the response message that is sent to the client (e.g., the response may specify the amount of time for which the configuration information is guaranteed or assumed to be valid).

As illustrated in this example, if the client staleness value does not exceed the pre-defined maximum staleness tolerance value (shown as the negative exit from 840), the method may include the client operating according to received configuration information, as in 850. Until or unless the maximum staleness tolerance value approaches (shown as the positive exit from 860) or the server pushes new or updated configuration information to the client (shown as the positive exit from 870) the client may continue to operate using the received configuration information, as in 875. This is illustrated in FIG. 8 by the negative exit from 860, the negative exit from 870, element 875, and the feedback from 875 to 860. However, if the maximum staleness tolerance value approaches (shown as the positive exit from 860), the method may include the client requesting and receiving updated configuration information (as in 880), and the client operating using the updated configuration information (as in 890). Similarly, if the maximum staleness tolerance is not approaching, but the server pushes new or updated configuration information to the client (shown as the positive exit from 870), the method may include the client operating using the updated configuration information (as in 890). For example, the configuration information itself may be updated or a new staleness value may be associated with the configuration information (indicating that the data is still valid and is not stale), in different embodiments.

Note that during the course of execution, various components of a distributed system may fail. For example, a given client of a distributed lock service may fail by crashing, by losing communication with the server cluster, by becoming unresponsive, and/or by otherwise malfunctioning in a manner that may prevent it from releasing held locks. This may lead to complications for the lock service implementation. For example, if a client acquires a given lock from the lock service and then crashes, that client may be unable to explicitly request that the lock service release the lock held by the client. In the absence of proper mechanisms to detect and deal with client failures, the client may hold the lock indefinitely, thereby preventing other clients from accessing the shared resource(s) associated with that lock and potentially causing system performance degradation or deadlock.

In some embodiments, a distributed system may use the transaction-based staleness protocol described herein to determine failure conditions on a client. For example, in system that implements a distributed lock service, the server cluster may need to detect when a client has failed and to revoke its locks to avoid lock starvation of other clients. In another example, if a client is partitioned away from the server cluster, the client may need to make a local decision to relinquish its locks in order to avoid a "split brain" condition in the system. In other words, the transaction-based staleness protocol may in some embodiments require both clients and servers to perform failure detection and to take appropriate action.

In some embodiments, failure on the client side may be defined by staleness. For example, if the data on the client is too stale (e.g., if its staleness exceeds a pre-defined staleness threshold), then the client may be deemed to have failed. Therefore, clients need to know the applicable staleness threshold. In some embodiments, clients may be configured to monitor their staleness and fire an alert when it grows beyond (or approaches) their staleness threshold. At that point, the client may need to stop using any locks it has acquired or any data item that is has read.

In some embodiments, failure of a client may be detected on a server as defined by inactivity on the part of client. For example, if the client has not exhibited any activity within a given time period, then the client may be deemed to have failed, from the perspective of the server. Note that in some embodiments, the server may only need to keep track of clients that are holding on to its resources, e.g., locks allocated to client by the server or shared resources protected by those locks. Servers may not have a requirement to detect failures of clients that are performing simple read-write transactions on the servers, in some embodiments. However, some clients may use the failure detection mechanism of the servers by keeping an active session (which may be mandatory when the client is using locks). In some embodiments, the client may keep itself from failing (from the perspective of the server) by sending transactions to the server that include a list of sessions to be monitored, and the server can propagate that information to the rest of the cluster using a gossip protocol. The server may track the time since it last heard from a client (i.e., a particular session). If the inactivity time exceeds a pre-determined failure threshold, the server may deem that the client has failed and may revoke the session at any time after that. This failure detection mechanism may be decoupled from the staleness computation performed on client. However, as with any other transactions, executing the transaction that include the sessions to be monitored (but no reads or writes of the data, metadata or shared state of the distributed system) may help keep the client's staleness values low. The protocol may allow multiple sessions to be started from the same physical connection, such that one client can start multiple sessions if this is desired. However, is should be noted that staleness is a property of the connection not the session. Consequently if the connection becomes stale all associated sessions will become stale as well.

The methods described herein may in various embodiments be implemented by any combination of hardware and software. For example, in one embodiment, the methods may be implemented by a computer system that includes a processor executing program instructions stored on a computer-readable storage medium coupled to the processor. The program instructions may be configured to implement the functionality described herein (e.g., the functionality of clients and servers that implement the transaction-based staleness protocol described herein).

Figure 9:
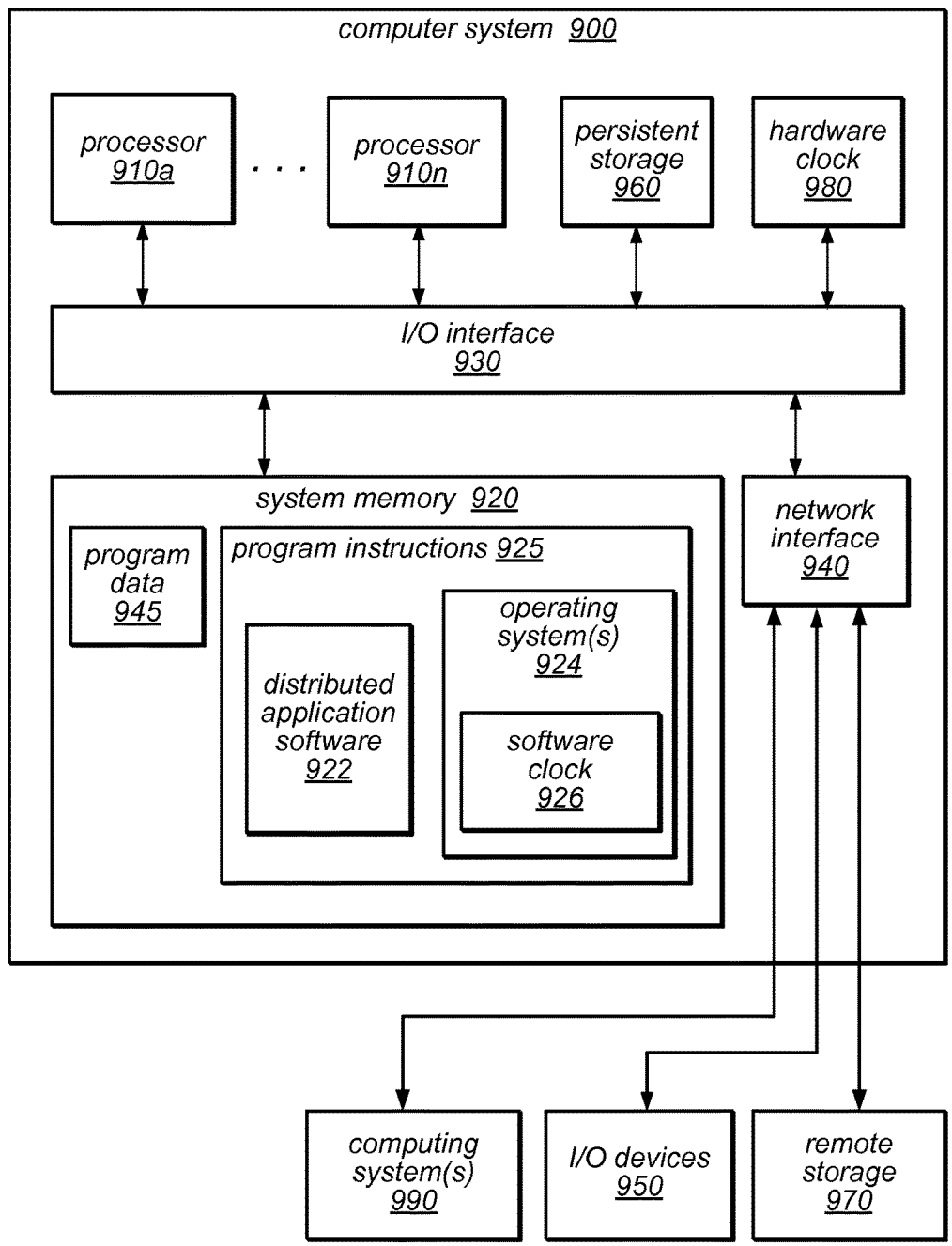
FIG. 9 is a block diagram illustrating a computer system configured to implement the transaction-based staleness protocol described herein between one or more clients and one or more servers of a distributed system, according to various embodiments.

FIG. 9 is a block diagram illustrating a computer system configured to execute a client, a server, and/or another participant in a distributed system configured to implement various methods described herein, according to some embodiments. For example, computer system 900 may be configured to implement the transaction-based staleness protocol described herein between one or more clients and one or more servers of a distributed storage system, a distributed lock service, a distributed system in which participants share configuration information, or any other distributed system in which staleness values associated with data items and/or their state are used in synchronizing data and operations of the system and/or in managing state changes in the system. Computer system 900 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 900 includes one or more processors 910 (any of which may include multiple cores, which may be single or multi-threaded) coupled to a system memory 920 via an input/output (I/O) interface 930. Computer system 900 further includes a network interface 940 coupled to I/O interface 930. In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA. The computer system 900 also includes one or more network communication devices (e.g., network interface 940) for communicating with other systems and/or components over a communications network (e.g. Internet, LAN, etc.). For example, a client application executing on system 900 may use network interface 940 to communicate with a server application executing on a single server or on a cluster of servers that implement a distributed system. In another example, an instance of a server application executing on computer system 900 may use network interface 940 to communicate with other instances of the server application that may be implemented on other computer systems.

In the illustrated embodiment, computer system 900 also includes one or more persistent storage devices 960. In various embodiments, persistent storage devices 960 may correspond to disk drives, tape drives, solid state memory, other mass storage devices, or any other persistent storage device. Computer system 900 (or a distributed application or operating system operating thereon) may store instructions and/or data in persistent storage devices 960, as desired, and may retrieve the stored instruction and/or data as needed.

In the example illustrated in FIG. 9, computer system 900 also includes a hardware clock 980. For example, hardware clock 980 may be implemented using a clock chip, which may be supported by the computer system BIOS. In such embodiments, BIOS services may be available by which software programs executing on computer system 900 (e.g., client, DLM node, operating system) may read the time. In some embodiments, client and/or server node software executing on the system may use hardware clock 980 to calculate client and/or node staleness as described above. In other embodiments, client and/or server node software may use an operating system software clock, such as software clock 926 of operating system 924 when calculating staleness.

Computer system 900 includes one or more system memories 920 that are configured to store instructions and data accessible by processor 910. In various embodiments, system memories 920 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 920 may contain program instructions 925 that are executable by processor(s) 910 to implement the methods and techniques described herein (e.g., executing transactions, providing a lock service, managing shared configuration information, and/or synchronizing data and/or operations of a distributed system using a transaction-based staleness protocol). In various embodiments, program instructions 925 may be encoded in platform native binary, any interpreted language such as Java™ byte-code, or in any other language such as C/C++, Java™, etc., or in any combination thereof. For example, in the illustrated embodiment, program instructions 925 include program instructions executable to implement distributed application software 922. In some embodiments, this software may correspond to a client application (e.g., user code 210 and/or client library 215 of client 205 in FIG. 2) configured to interact with a distributed application (e.g., distributed storage system or lock manager) and to implement various methods described herein, such as calculating node and/or client staleness. In some embodiments distributed application software 922 may implement a distributed node (e.g., a server node in a cluster of server nodes), which may be configured to communicate with one or more clients and one or more other nodes, such as to implement a distributed storage service or locking service. In some embodiments, program instructions 925 may implement multiple separate clients, server nodes, and/or other components.

In some embodiments, program instructions 925 may include instructions executable to implement operating system 924, which may be any of various operating systems, such as UNIX, LINUX, Solaris™, MacOS™, Windows™, etc. In various embodiments, operating system 924 may include a software system clock 926. In some embodiments, distributed application software 922 may utilize software clock 926 for determining current time and/or calculating staleness. For example, if distributed software 922 implements a client library (such as 215), then in some embodiments, the client library may sample software clock 926 for a clock value and send the clock value to a server node as part of a transaction request message, as described herein. The client library may also sample software clock 926 to calculate a client staleness of data received from a distributed application and/or an overall staleness of such data.

Any or all of program instructions 925, including distributed application software 922, operating system 924, and software clock 926 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 900 via I/O interface 930. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 940.

In some embodiments, system memory 920 may include storage for program data 945, which may be configured as described herein. For example, the information described herein as being stored in a logical registry may be partitioned between a logical registry included in program data 945 of system memory 920 and one or more other logical registries included on one or more other computing systems (e.g., other server nodes) and/or on one or more remote storage devices 970, in various embodiments. In some embodiments, system memory 920 (e.g., program data 945 within system memory 920) and/or remote storage 970 may store data items, replicas of data items, metadata associated with data items and/or their state, shared configuration information, lock ownership records and/or lock metadata, node staleness values, client staleness values, timestamps, transaction read sets, transaction write sets, parameter values useable in executing transactions or in implementing the transaction-based staleness protocol described herein, and/or any other information usable in implementing the methods and techniques described herein.

In one embodiment, I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other devices attached to a network, such as other computer systems 990 (which may implement one or more server nodes and/or clients of the distributed system), for example. In addition, network interface 940 may be configured to allow communication between computer system 900 and various I/O devices 950 and/or remote storage 970. Input/output devices 950 may, in some embodiments, include one or more display terminals, keyboards, keypads, touchpads, scanning devices, voice or optical recognition devices, or any other devices suitable for entering or retrieving data by one or more computer systems 900. Multiple input/output devices 950 may be present in computer system 900 or may be distributed on various nodes of a distributed system that includes computer system 900. In some embodiments, similar input/output devices may be separate from computer system 900 and may interact with one or more nodes of a distributed system that includes computer system 900 through a wired or wireless connection, such as over network interface 940. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol. In various embodiments, computer system 900 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, nodes 232 in FIG. 2A may present their functionality to each other and/or to clients 205 as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more processors; and
a memory coupled to the one or more processors, the memory storing program instructions executable by the one or more processors to implement a server node of a distributed data system;
wherein the server node is configured to:
receive a message from a client comprising a request to read a data item; and
in response to receiving the message:
determine a node staleness value that is associated with the data item from a perspective of the server node, wherein the node staleness value represents an upper bound on the amount of time that has elapsed, at the time when the node staleness value is determined, since the data item or a state associated with the data item was known by the server node to be valid and during which the requested data item or the state was subject to invalidation by updates to the requested data item or the state associated with the requested data item at one or more other server nodes of the distributed data system;
assemble a response message, wherein the response message comprises the data item and an indication of the node staleness value, wherein the node staleness value is usable by the client to determine a staleness of the requested data item that includes the amount of time that elapsed prior to the node staleness value being determined; and
send the response message to the client.

2. The system of claim 1,
wherein the message is a transaction request message, and wherein the transaction comprises the request to read the data item and a request to write another data item;
wherein the server node is configured to send the response message to the client without waiting for the write of the other data item to be committed on the server node.

3. The system of claim 2, wherein the server node is further configured to commit the write of the other data item, wherein successfully committing the write of the other data item comprises storing one or more replicas of the other data item on respective server nodes in the system.

4. The system of claim 3, wherein in response to successfully committing the write of the other data item, the server node is further configured to send another response message to the client, wherein the other response message indicates that the write of the other data item was committed, and wherein sending the other response message to the client indicates to the client that the transaction has succeeded and that the data item that was read is valid.

5. The system of claim 3, wherein in response to an unsuccessful commit of the write of the other data item, the server node is further configured to send another response message to the client, wherein the other response message indicates that the write of the other data item failed, and wherein sending the other response message to the client indicates to the client that the transaction has failed and that the data item that was read is invalid.

6. The system of claim 1, wherein the server node is one of a plurality of server nodes that coordinate with one another to maintain a shared state in the system.

7. The system of claim 1, wherein the node staleness value is a single value that represents the staleness of a collection of physically related data items or logically related data items.

8. The system of claim 1, wherein the message comprises a request for a lock on a shared resource, wherein the requested data item comprises an indication of lock ownership, and wherein the node staleness value represents a staleness of a state of the lock from the perspective of the server node.

9. A system, comprising:
one or more processors; and
a memory coupled to the one or more processors, the memory storing program instructions executable by the one or more processors to implement a client;
wherein the client is configured to:
send a message to a server of a distributed data system, wherein the message comprises a request for a data item maintained by the distributed data system;
receive a response message from the server, wherein the response message comprises the requested data item and an indication of a node staleness value that is associated with the requested data item from a perspective of the server, wherein the node staleness value represents an upper bound on the amount of time that has elapsed, prior to the server determining the node staleness value, since the requested data item or a state associated with the requested data item was known by the server to be valid according to the distributed data system;
compute a client staleness value for the requested data item or the state associated with the requested data item from a perspective of the client, wherein said computing is dependent on the indication of the node staleness value that was included in the response message, and wherein the client staleness value represents an upper bound on the amount of time that has elapsed, at the time of said computing, since the requested data item or the state associated with the requested data item, as returned in the response message, could have been considered by the client to be valid according to the distributed data system;
determine whether the client staleness value exceeds a pre-determined value for the requested data item or the state associated with the requested data item; and
in response to determining the client staleness value does not exceed the pre-determined value, use the requested data item received in the response message.

10. The system of claim 9,
wherein the message is a transaction request message, and wherein the requested transaction comprises the request to read the data item and a request to write another data item; and
wherein the client is configured to refrain from using the requested data item until another response is received from the server indicating whether the other data item was successfully written.

11. The system of claim 10, wherein in response to receiving another response indicating that the write of the other data item was not committed or that the requested transaction has failed, the client is configured to discard the requested data item without using it.

12. The system of claim 10, wherein in response to receiving another response indicating that the write of the other data item was not committed or that the requested transaction has failed, the client is configured to send another transaction request message to the server to retry the requested transaction.

13. The system of claim 10, wherein the client is configured to use the requested data item in response to receiving another response indicating that the write of the other data item was committed and the requested transaction has succeeded.

14. The system of claim 9, wherein the client does not maintain a persistent connection with the server.

15. A method, comprising:
sending, by a client, a transaction request message to a server of a distributed data system, wherein the transaction request comprises a request for a data item that is maintained by the distributed data system;
receiving, by the client, a transaction response message from the server, wherein the transaction response message comprises the requested data item and an indication of a node staleness value that is associated with the requested data item from a perspective of the server, wherein the node staleness value represents an upper bound on the amount of time that has elapsed, prior to the server determining the node staleness value, since the requested data item or a state associated with the requested data item was known by the server to be valid according to the distributed data system;
computing, by the client, a client staleness value for the requested data item or the state associated with the requested data item from a perspective of the client, wherein said computing is dependent on the indication of the node staleness value that was included in the transaction response message, and wherein the client staleness value represents an upper bound on the amount of time that has elapsed, at the time of said computing, since the requested data item or the state associated with the requested data item, as returned in the transaction response message, could have been considered by the client to be valid according to the distributed data store;
determining, by the client, whether the client staleness value exceeds a pre-determined value for the requested data item or the state associated with the requested data item; and
in response to determining the client staleness value does not exceed the pre-determined value, using by the client, the requested data item received in the transaction response message.

16. The method of claim 15, further comprising, subsequent to said sending, said receiving, and said computing:
computing an updated client staleness value for the requested data item or the state associated with the requested data item, wherein said computing an updated client staleness value comprises adding to the client staleness value, an amount of time that has elapsed since the client staleness value was computed;

determining whether the updated client staleness value exceeds a pre-determined maximum staleness tolerance value for the requested data item or the state associated with the requested data item; and wherein said in response to determining the client staleness value does not exceed the pre-determined value, using by the client, the requested data item comprises:
in response to determining that the updated client staleness value does not exceed the pre-determined maximum staleness tolerance value for the requested data item or the state associated with the requested data item, using the requested data item as received in the transaction response message.

17. The method of claim 16, wherein the maximum staleness tolerance value is configurable on a system basis, on a user basis, on an account basis, on an application basis, or on a data item basis.

18. The method of claim 15, wherein said computing comprises adding to the node staleness value a value representing an amount of time that elapsed between a time at which the client sent the transaction request message and a time at which the client received the transaction response message.

19. The method of claim 15, further comprising, for another request for another data item performing said sending, said receiving, and said computing:
computing an updated client staleness value for the other requested data item or the state associated with the other requested data item, wherein said computing an updated client staleness value comprises adding to the client staleness value, an amount of time that has elapsed since the client staleness value was computed;
determining whether the updated client staleness value exceeds a pre-determined maximum staleness tolerance value for the other requested data item or the state associated with the other requested data item; and
in response to determining that the updated client staleness value exceeds the pre-determined maximum staleness tolerance value for the other requested data item or the state associated with the other requested data item, sending another transaction request message to the server comprising a request for the other data item.

20. A method, comprising:
receiving, at a given server, a transaction request message from a client comprising a request for a data item that is stored in a distributed data store, wherein the given server is one of a plurality of servers that coordinate with one another to maintain a shared state of the distributed data store; and
in response to said receiving:
determining, by the given server, a node staleness value that is associated with the requested data item from a perspective of the server, wherein the node staleness value represents an upper bound on an amount of time that has elapsed, at the time of said determining, since the requested data item or a state associated with the requested data item was known by the given server to be valid and during which the requested data item or the state known to the server was subject to invalidation by updates to the requested data item or the state at one or more other servers of the plurality of servers;
assembling, by the given server, a transaction response message, wherein the transaction response message comprises the requested data item and an indication of the node staleness value, wherein the indication of the node staleness value is usable by the client to determine a staleness of the requested data item that includes the amount of time that elapsed prior to the node staleness value being determined; and
sending, by the given server, the transaction response message to the client.

21. The method of claim 20, wherein two or more of the plurality of servers store replicas of the requested data item, and wherein said determining comprises computing an elapsed time between a time at which the requested data item was updated on a first one of the plurality of servers and a time at which the requested data item was updated on the given server.

22. The method of claim 20, wherein the transaction request message comprises a request for configuration information that is shared by a plurality of clients, and wherein the node staleness value represents a staleness of the shared configuration information from the perspective of the given server.

23. A non-transitory computer-readable storage medium storing program instructions that when executed on one or more computers cause the one or more computers to implement a client;
wherein the client is configured to:
send a transaction request message to a server of a distributed data system, wherein the requested transaction comprises a read request and a write request;
receive a transaction response message from the server, wherein the transaction response message comprises a data item targeted by the read request and an indication of a node staleness value that is associated with the data item from a perspective of the server, wherein the node staleness value represents an upper bound on the amount of time that has elapsed, prior to the server determining the node staleness value, since the data item or a state associated with the data item was known by the server to be valid according to the distributed data system;
compute a client staleness value for the data item or the state associated with the data item from a perspective of the client, wherein said computing is dependent on the indication of the node staleness value that was included in the transaction response message, and wherein the client staleness value represents an upper bound on the amount of time that has elapsed, at the time of said computing, since the data item or the state associated with the data item, as returned in the transaction response message, could have been considered by the client to be valid according to the distributed data system;
determine whether the client staleness value exceeds a pre-determined value for the requested data item or the state associated with the requested data item; and
subsequent to determining the client staleness value does not exceed the pre-determined value, refrain from using the data item until another transaction response message is received from the server indicating whether another data item targeted by the write request was successfully written.

24. The non-transitory computer-readable storage medium of claim 23, wherein the client is further configured to:
use the data item in response to receiving another transaction response message from the sever indicating that the write of the other data item was successfully committed and that the requested transaction has succeeded; and discard the data item without using it in response to receiving another transaction response message from the server indicating that the write of the other data item was not successfully committed or that the requested transaction has failed.

25. The non-transitory computer-readable storage medium of claim 23, wherein the transaction request message and the transaction response message conform to an application programming interface (API) that defines a transaction-based staleness protocol.

26. A non-transitory computer-readable storage medium storing program instructions that when executed on one or more computers cause the one or more computers to implement a server node in a distributed data system;
   wherein the server node is configured to:
      receive a transaction request message, wherein the requested transaction comprises a read request and a write request; and
      in response to receiving the transaction request message:
         determine a node staleness value that is associated with a data item targeted by the read request from a perspective of the server node, wherein the node staleness value represents an upper bound on the amount of time that has elapsed, at the time when the node staleness value is determined, since the data item or a state associated with the data item was known by the server node to be valid and during which the data item or the state known to the server node was subject to invalidation by updates to the data item or the state at one or more other servers of the distributed data system;
         assemble a response message, wherein the response message comprises the data item and an indication of the node staleness value, wherein the node staleness value is usable by the client to determine a staleness of the requested data item that includes the amount of time that elapsed prior to the node staleness value being determined; and
         send the response message to the client;
      wherein the server node is configured to determine the node staleness value, assemble the response message, and send the response message to the client without waiting for the write request to be committed.

27. The non-transitory computer-readable storage medium of claim 26, wherein in response to receiving the transaction request message, the server node is further configured to:
   perform the requested write, wherein the requested write comprises an operation to write a new data item or to update an existing data item; and
   create or update a node staleness value for the data item targeted by the requested write to reflect that the data item targeted by the requested write was known by the server node to be valid at a time associated with the write request.

* * * * *